US012552282B2

(12) United States Patent
Morishima

(10) Patent No.: US 12,552,282 B2
(45) Date of Patent: Feb. 17, 2026

(54) VEHICLE MANAGEMENT DEVICE AND VEHICLE MANAGEMENT METHOD

(71) Applicant: TOYOTA JIDOSHA KABUSHIKI KAISHA, Toyota (JP)

(72) Inventor: Akinori Morishima, Naka-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 749 days.

(21) Appl. No.: 18/055,453

(22) Filed: Nov. 15, 2022

(65) Prior Publication Data

US 2023/0219444 A1 Jul. 13, 2023

(30) Foreign Application Priority Data

Jan. 13, 2022 (JP) ................................ 2022-003558

(51) Int. Cl.
*B60L 53/63* (2019.01)
*B60L 53/62* (2019.01)
*B60L 53/65* (2019.01)
*B60L 53/66* (2019.01)

(52) U.S. Cl.
CPC .............. *B60L 53/63* (2019.02); *B60L 53/62* (2019.02); *B60L 53/65* (2019.02); *B60L 53/66* (2019.02)

(58) Field of Classification Search
CPC .......... B60L 53/63; B60L 53/62; B60L 53/65; B60L 53/66; B60L 2240/622; B60L 2240/70; B60L 53/64; B60L 53/665; B60L 53/67; B60L 53/68; B60L 58/12; B60L 55/00; G06Q 30/08; G06Q 50/06; G06Q 50/40; G08G 1/20; Y02T 10/70
See application file for complete search history.

(56) References Cited

U.S. PATENT DOCUMENTS

| 2011/0276194 A1* | 11/2011 | Emalfarb | B60L 53/66 700/297 |
| 2014/0253037 A1* | 9/2014 | Yano | H02J 3/144 320/109 |
| 2018/0178669 A1 | 6/2018 | Kudo et al. | |
| 2020/0231063 A1* | 7/2020 | Sadano | H02J 3/144 |

FOREIGN PATENT DOCUMENTS

WO  WO 2017/009976 A1  1/2017

* cited by examiner

*Primary Examiner* — Aniss Chad
*Assistant Examiner* — Christine Nguyen Huynh
(74) *Attorney, Agent, or Firm* — Finnegan, Henderson, Farabow, Garrett and Dunner, LLP

(57) ABSTRACT

A vehicle management device manages a vehicle group. The vehicle management device includes one or more computers. The vehicle management device periodically communicates with one or more target vehicles in the vehicle group. The target vehicles are operable as a balancing power for a power grid. The vehicle management device communicates with the target vehicles in at least one of a first period, a second period, and a third period at a frequency higher than an average communication frequency in periods excluding the first to third periods. The first period is immediately before a bid and a contract are made for the balancing power for the external power supply in an electricity market. The second period is immediately before a deadline for submission of a supply and demand planned value. The third period is a period in which provision of the balancing power for the external power supply is requested.

19 Claims, 13 Drawing Sheets

VEHICLE MANAGEMENT DEVICE AND VEHICLE MANAGEMENT METHOD

CROSS-REFERENCE TO RELATED APPLICATION

This application claims priority to Japanese Patent Application No. 2022-003558 filed on Jan. 13, 2022, incorporated herein by reference in its entirety.

BACKGROUND

1. Technical Field

The present disclosure relates to a vehicle management device and a vehicle management method.

2. Description of Related Art

For example, WO 2017/009976 discloses a technology for operating a vehicle as a balancing power for an external power supply.

SUMMARY

Even the vehicle operable as the balancing power for the external power supply has a possibility of not functioning as the balancing power for the external power supply depending on a status of the vehicle. For example, the vehicle that is not electrically connected to the external power supply does not function as the balancing power for the external power supply. To appropriately manage the vehicle to be operated as the balancing power for the external power supply, it is necessary to accurately grasp the status of the vehicle.

The status of the vehicle changes from moment to moment. To grasp the status of the vehicle, a server that manages the vehicle may frequently communicate with the vehicle to sequentially acquire real-time statuses from the vehicle. When the frequency of communication with the vehicle is increased, however, the communication cost increases. Further, the frequent communication over a long period may lead to an increase in a processing load and/or a power consumption. Therefore, keeping the high frequency of communication over a long period is not necessarily appropriate in terms of the management of the vehicle to be operated as the balancing power for the external power supply.

The present disclosure provides a management device and a management method for appropriately managing a vehicle to be operated as a balancing power for an external power supply.

A vehicle management device according to a first aspect of the present disclosure is configured to manage a plurality of vehicles. The vehicle management device includes one or more computers. The vehicle management device is configured to periodically communicate with one or more target vehicles included in the plurality of vehicles. The target vehicles are operable as a balancing power for an external power supply. The vehicle management device is configured to communicate with the target vehicles in at least one of a first period, a second period, and a third period at a frequency higher than an average communication frequency in periods excluding the first to third periods. The first period is immediately before a contract. The second period is immediately before a deadline for submission of a supply and demand planned value. The third period is a period in which provision of the balancing power for the external power supply is requested.

A user can make a bid for a product (balancing power) sold in an electricity market. However, a user who does not provide the balancing power won (contracted) in the electricity market is penalized for non-compliance with the contract. For this reason, the user is required, before concluding the contract, to determine whether the user can provide the balancing power requested by the product (trading target). A user who has won the balancing power for the external power supply or a user who is responsible for achieving the power balancing of the external power supply is required to submit the supply and demand planned value to a predetermined institution by a predetermined deadline. The supply and demand planned value is a planned value of at least one of demand and supply. The user can provide the requested balancing power by causing the vehicles to operate as the balancing power during a balancing period in which the provision of the balancing power is requested. When any vehicle does not operate as the balancing power due to some trouble in the balancing period, however, the user is required to prepare a substitute vehicle. The balancing period is a period in which the provision of the balancing power is requested, and is commonly referred to also as "providing period". The length of the balancing period is commonly referred to also as "duration".

The vehicle management device is configured to selectively increase the communication frequency in at least one of the first to third periods.

The vehicle management device communicates with the target vehicles at a high frequency in the first period (i.e., the period immediately before the contract), thereby accurately grasping the statuses of the target vehicles (by extension, the balancing power providable by the target vehicles) at the time of bidding (immediately before the contract). Thus, it is easier for the user to make a bid for the product (balancing power) based on the balancing power providable by the target vehicles.

The vehicle management device communicates with the target vehicles at a high frequency in the second period (i.e., the period immediately before the deadline for submission of the supply and demand planned value), thereby accurately grasping the statuses of the target vehicles (by extension, the supply and demand status of the target vehicles) immediately before the deadline for submission of the supply and demand planned value. Thus, it is easier for the user to submit a more accurate supply and demand planned value to the predetermined institution. Since the user who has submitted the supply and demand planned value is required to provide the balancing power in accordance with the supply and demand planned value, it is easier to secure the required balancing power as the supply and demand planned value is more accurate.

The vehicle management device communicates with the target vehicles at a high frequency in the third period (the period corresponding to the balancing period), thereby accurately grasping the statuses of the target vehicles (by extension, the balancing power providable by the target vehicles) during the balancing period. Therefore, when any vehicle does not operate as the balancing power due to some trouble in the third period, it is easier for the user to select an appropriate vehicle as the substitute vehicle.

In the above configuration, the increase in the communication frequency can be suppressed within a short period by selectively increasing the communication frequency in at least one of the first to third periods. Therefore, it is possible to suppress troubles (increase in communication cost, etc.) along with the increase in the communication frequency.

As described above, according to the vehicle management device having the above configuration, it becomes easier to appropriately manage the vehicles to be operated as the balancing power for the external power supply.

The vehicle management device may be one computer, or may be composed of a plurality of mutually communicable computers. The computer included in the vehicle management device is hereinafter referred to also as "management computer". The target vehicles may be all or part of the vehicles managed by the management computer.

The balancing power means the capability in general to perform power balancing of the external power supply (frequency control, supply and demand balancing, etc.), and includes reserves. The external power supply may be a power grid (e.g., a microgrid or a large-scale power grid developed as an infrastructure). The external power supply may supply alternate current (AC) power or direct current (DC) power. The communication frequency may be represented by a communication cycle (communication interval). For example, when the communication cycle is 30 minutes, the communication frequency is 48 times per day, and when the communication cycle is one hour, the communication frequency is 24 times per day.

The periods excluding the first to third periods are hereinafter referred to as "other periods". A period between the first period and the second period is referred to as "first intermediate period". A period between the second period and the third period is referred to as "second intermediate period". The first and second intermediate periods are the other periods. The management computer may regard an average communication frequency in the first and second intermediate periods as the average communication frequency in the other periods. The management computer may set the average communication frequency in at least one of the first to third periods to 1.5 times or more and less than 15 times as high as the average communication frequency in the other periods.

The vehicle management device may be configured to make a bid for the balancing power in the electricity market. The vehicle management device may be configured to send a notification for causing one or more vehicles selected from among the target vehicles to operate as the balancing power contracted in the electricity market. The first period may be at least a part of a period from a timing that is three hours before the contract to a contract timing.

According to the above configuration, it becomes easier for the vehicle management device to appropriately make a bid for the balancing power in the electricity market. A bid is made prior to the contract. The first period may be the bidding period (e.g., at least a part of a period from a timing that is two hours before the bidding to the bidding timing).

The vehicle management device may be configured to determine the supply and demand planned value using information acquired from the target vehicles through communication. The vehicle management device may be configured to transmit the determined supply and demand planned value by the deadline for submission of the supply and demand planned value. The second period may be at least a part of a period from a timing that is three hours before the deadline for submission of the supply and demand planned value to the deadline for submission of the supply and demand planned value.

According to the above configuration, it becomes easier for the vehicle management device to submit an appropriate supply and demand planned value to the predetermined institution by the deadline. The deadline for submission of the supply and demand planned value may be gate closing.

The third period may be the period in which the provision of the balancing power for the external power supply is requested or a period obtained by adding a margin period of 30 minutes or less to at least one of parts before and after the period in which the provision of the balancing power for the external power supply is requested. The vehicle management device may be configured to determine whether all of one or more vehicles selected from among the target vehicles operate as the balancing power for the external power supply in the third period. The vehicle management device may be configured to, when determination is made that any of the one or more vehicles selected from among the target vehicles does not operate as the balancing power for the external power supply in the third period, select a substitute vehicle from among the target vehicles using information acquired from the target vehicles through communication.

According to the above configuration, when any vehicle does not operate as the balancing power due to some troubles in the third period, it becomes easier for the vehicle management device to select an appropriate vehicle as the substitute vehicle (i.e., the vehicle that operates as the balancing power as a substitute for the vehicle that does not operate as the balancing power).

The vehicle management device may be configured to communicate with the target vehicles in each of the first period, the second period, and the third period at the frequency higher than the average communication frequency in the periods excluding the first period, the second period, and the third period. The vehicle management device may be configured to perform behavior prediction for the target vehicles using information acquired from the target vehicles through communication in each of the first period, the second period, and the third period.

According to the above configuration, it becomes easier for the vehicle management device to appropriately perform the behavior prediction for the target vehicles. The vehicle management device can easily determine at least one of the supply and demand status of the target vehicles and the balancing power providable by the target vehicles using the prediction information about the behaviors of the target vehicles.

The vehicle management device may be configured to periodically acquire vehicle information about the target vehicles by communicating with the target vehicles. The vehicle information may include at least one of positions of the target vehicles and states of charge (SOCs) of power storage devices provided in the target vehicles.

According to the above configuration, the vehicle management device can easily determine at least one of the supply and demand status of the target vehicles and the balancing power providable by the target vehicles.

The plurality of vehicles may include a non-target vehicle that does not operate as the balancing power for the external power supply. The vehicle management device may be configured to communicate with the target vehicles in at least one of the first period, the second period, and the third period at a frequency higher than a frequency of communication with the non-target vehicle.

The vehicle management device may manage the vehicles (non-target vehicles) for purposes other than the power balancing. For example, the vehicle management device may use information acquired from the vehicles through communication to provide a service for notifying the users about charging timings suitable for the statuses of the vehicles. In each of the first to third periods, however, the information about the target vehicles is particularly requested. The vehicle management device communicates with the target vehicles in at least one of the first to third periods at the frequency higher than the frequency of communication with the non-target vehicle. By selectively increasing the frequency of communication with the target vehicles having a high priority, it is possible to suppress troubles (increase in communication cost, etc.) along with the increase in the communication frequency.

A vehicle management method according to a second aspect of the present disclosure includes periodically communicating, by a vehicle management device, with one or more target vehicles in a communication period including a first period set as a period immediately before a contract, a second period set as a period immediately before a deadline for submission of a supply and demand planned value, and a third period set as a period in which provision of a balancing power for an external power supply is requested, determining, by the vehicle management device, whether at least one of the first period, the second period, and the third period is within a communication frequency increase period, and communicating, by the vehicle management device, with the target vehicles in the communication frequency increase period at a frequency higher than an average communication frequency in the communication period excluding the first period, the second period, and the third period.

According to the vehicle management method as well, it is possible to appropriately manage the vehicles to be operated as the balancing power for the external power supply as in the vehicle management device described above.

The vehicle management method may further include predicting, in the first period, the balancing power providable by the target vehicles using information acquired from the target vehicles through communication, determining, in the second period, the supply and demand planned value using the information acquired from the target vehicles through the communication, causing, in the third period, one or more vehicles selected from among the target vehicles to operate as the balancing power for the external power supply, and when any of the one or more vehicles selected from among the target vehicles is not operating as the balancing power for the external power supply in the third period, selecting a substitute vehicle from among the target vehicles using information acquired from the target vehicles through communication.

According to the above configuration, the power balancing of the external power supply can easily be performed appropriately by the managed vehicles.

The vehicles managed by any of the device and the method described above may be electrified vehicles (hereinafter also referred to as "xEVs") including power storage devices. The xEVs are vehicles that use electric power as all or part of their power source. The xEVs include battery electric vehicles (BEVs), plug-in hybrid electric vehicles (PHEVs), fuel cell electric vehicles (FCEVs), and range extender EVs.

According to the present disclosure, it is possible to appropriately manage the vehicle to be operated as the balancing power for the external power supply.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
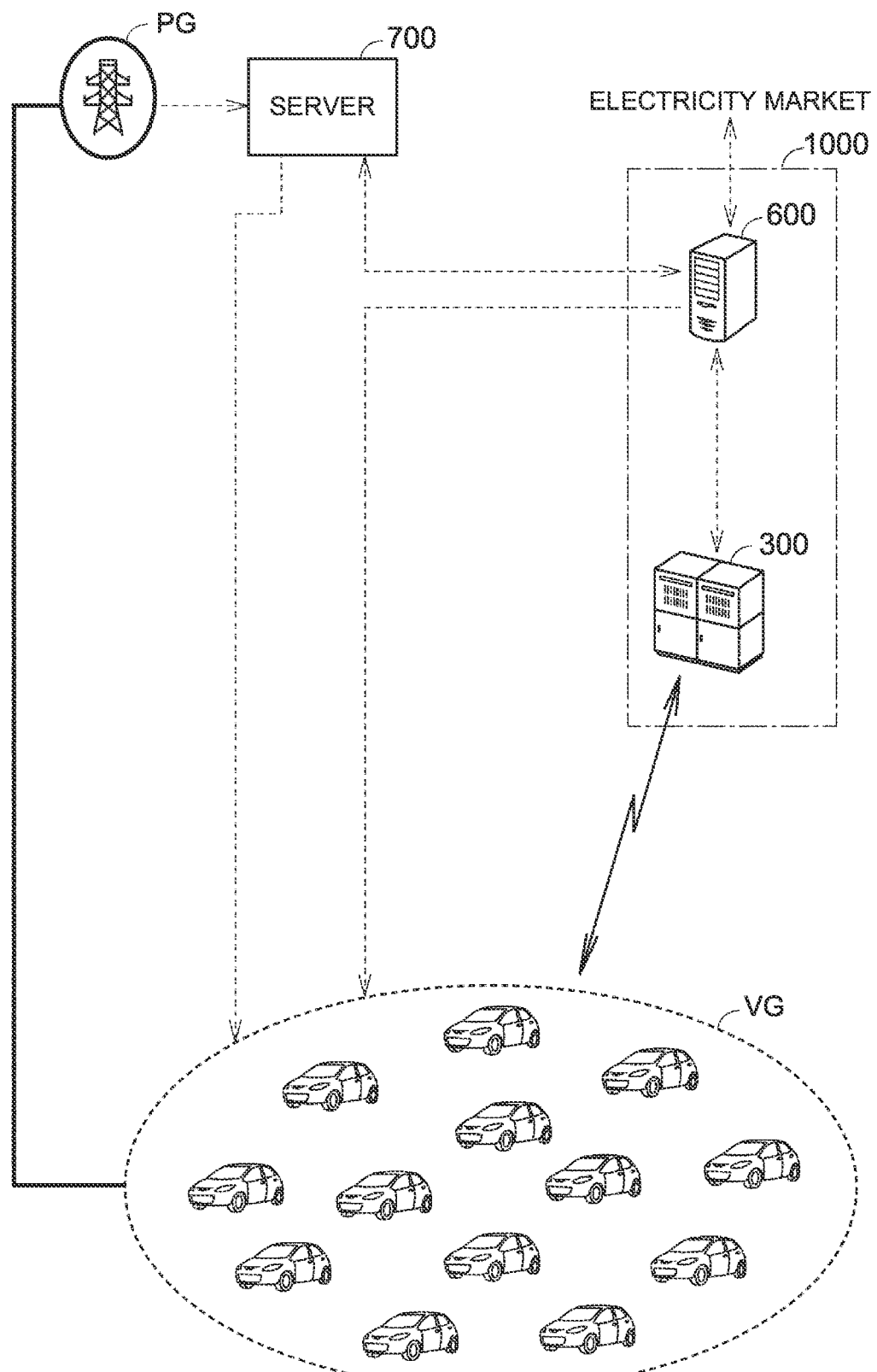
FIG. 1 is a diagram showing a schematic configuration of a power management system according to an embodiment of the present disclosure.

An embodiment of the present disclosure will be described in detail with reference to the drawings. In the drawings, the same or corresponding parts are denoted by the same reference signs and the description thereof will not be repeated.

FIG. 1 is a diagram showing a schematic configuration of a power management system according to the embodiment of the present disclosure. Referring to FIG. 1, the power management system according to the present embodiment includes a vehicle group VG, a server 700, and a vehicle management device 1000. The vehicle management device 1000 includes servers 300 and 600. Each of the servers 300 and 600 is a management computer.

A power grid PG is a power network formed by power transmission and distribution equipment. A plurality of power plants is connected to the power grid PG. Electric power is supplied from the power plants to the power grid PG. In the present embodiment, an electric power company maintains and manages the power grid PG (commercial power supply). The electric power company corresponds to a transmission system operator (TSO) (grid operator) described later. The power grid PG supplies alternate current (AC) power (e.g., three-phase AC power). The server 700 is a computer that belongs to the TSO (hereinafter sometimes referred to as "TSO server"). The server 700 incorporates a central feed system and a simple command system described later. The server 600 and the server 700 are communicable with each other. The power grid PG according to the present embodiment is an example of an "external power supply" according to the present disclosure.

The server 300 is configured to manage the vehicle group VG. The server 300 is hereinafter sometimes referred to as a "vehicle information management server". Although details will be described later, the server 300 is configured to periodically communicate with each vehicle in the vehicle group VG. In the present embodiment, each vehicle in the vehicle group VG is an example of a "target vehicle" according to the present disclosure. The number of vehicles in the vehicle group VG may be 5 or more and less than 30, 30 or more and less than 100, or 100 or more. It is assumed in the present embodiment that the vehicle group VG includes about 50 vehicles.

Figure 2:
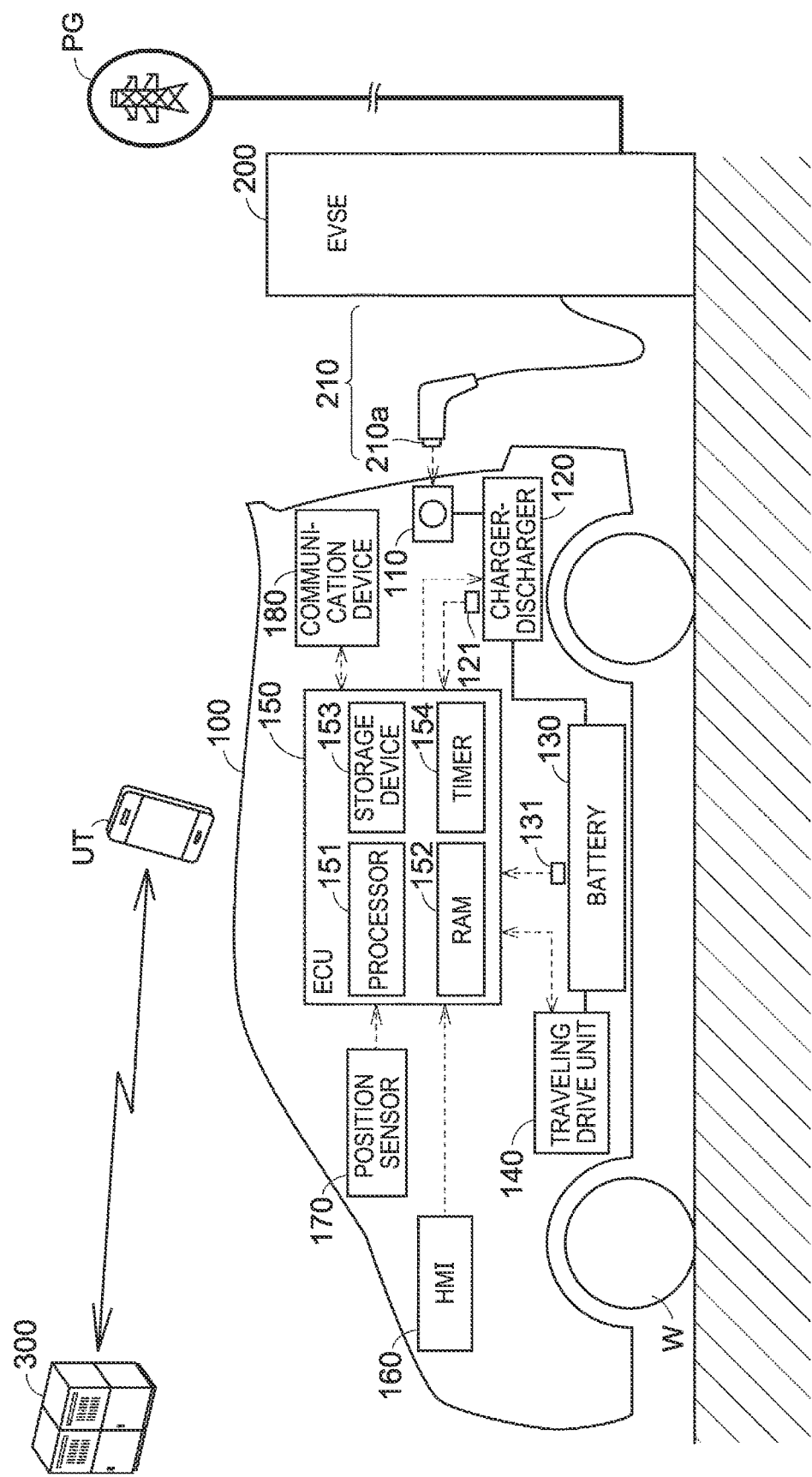
FIG. 2 is a diagram showing an example of the configuration of a target vehicle.

Each vehicle in the vehicle group VG is an xEV, and is operable as a balancing power for the power grid PG. Hereinafter, each vehicle in the vehicle group VG will be referred to as "vehicle 100" when not individually identified. FIG. 2 is a diagram showing the configuration of the vehicle 100.

Referring to FIG. 2, the vehicle 100 includes a battery 130 that stores electric power for causing the vehicle 100 to travel. The vehicle 100 is travelable using the electric power stored in the battery 130. The vehicle 100 according to the present embodiment is a battery electric vehicle (BEV) without an engine (internal combustion engine). The battery 130 can be a known power storage device for vehicles (e.g., a liquid secondary battery, an all-solid-state secondary battery, or an assembled battery). Examples of the secondary battery for vehicles include a lithium-ion battery and a nickel metal hydride battery. The battery 130 according to the present embodiment is an example of a "power storage device" according to the present disclosure.

The vehicle 100 includes an electronic control unit (hereinafter referred to as "ECU") 150. The ECU 150 is configured to execute charge control and discharge control of the battery 130. The vehicle 100 further includes a monitoring module 131 that monitors the state of the battery 130. The monitoring module 131 includes various sensors for detecting the state of the battery 130 (e.g., voltage, current, and temperature), and outputs the detection result to the ECU 150. The monitoring module 131 may be a battery management system (BMS) having a state of charge (SOC) estimation function, a state of health (SOH) estimation function, a cell voltage equalization function, a diagnostic function, and a communication function, in addition to the above sensor function. The ECU 150 can acquire the state of the battery 130 (e.g., temperature, current, voltage, SOC, and internal resistance) based on the output of the monitoring module 131.

The vehicle 100 is electrically connectable to, for example, electric vehicle supply equipment (EVSE) 200 shown in FIG. 2. The EVSE 200 is power supply equipment outside the vehicle. The EVSE 200 is electrically connected to the power grid PG, and is configured to receive and supply electric power from the power grid PG. A charging cable 210 is connected to the main body of the EVSE 200. The charging cable 210 may always be connected to the main body of the EVSE 200, or may be detachable from the main body of the EVSE 200. The charging cable 210 includes a connector 210a at the tip thereof and includes a communication line and a power line inside. One electric wire may serve as both the communication line and the power line. The EVSE 200 may be domestic EVSE or public EVSE.

The vehicle 100 includes an inlet 110 and a charger-discharger 120. The vehicle 100 is electrically connected to the power grid PG via the EVSE 200 when the connector 210a of the charging cable 210 connected to the main body of the EVSE 200 is connected to the inlet 110 of the vehicle 100 (hereinafter also referred to as "plugged-in state"). The vehicle 100 is not electrically connected to the EVSE 200 and the power grid PG while the vehicle 100 is traveling (hereinafter also referred to as "plugged-out state"). FIG. 2 shows only the inlet 110 and the charger-discharger 120 compatible with the electric power supply method of the EVSE 200. However, the vehicle 100 may include a plurality of inlets such that the vehicle 100 can support a plurality of types of electric power supply methods (e.g., alternate current (AC) method and direct current (DC) method).

The charger-discharger 120 is located between the inlet 110 and the battery 130. The charger-discharger 120 includes a charge-discharge relay and an electric power conversion circuit (neither shown). The charge-discharge relay switches connection and disconnection of an electric power path from the inlet 110 to the battery 130. The electric power conversion circuit includes, for example, a bidirectional inverter. Each of the charge-discharge relay and the electric power conversion circuit included in the charger-discharger 120 is controlled by the ECU 150. The vehicle 100 further includes a monitoring module 121 that monitors the state of the charger-discharger 120. The monitoring module 121 includes various sensors for detecting the state of the charger-discharger 120 (e.g., current sensor and voltage sensor), and outputs the detection result to the ECU 150.

In the vehicle 100 in the plugged-in state, external charging (i.e., charging of the battery 130 with electric power from the outside of the vehicle) and external electric power supply (i.e., power feeding to the outside of the vehicle with electric power in the battery 130) can be performed. The vehicle 100 can balance the electric power in the power grid PG by the external charging and the external electric power supply. The electric power for the external charging is supplied, for example, from the EVSE 200 to the inlet 110 through the charging cable 210. The charger-discharger 120 is configured to convert the electric power received by the inlet 110 (e.g., AC power) into electric power suitable for charging the battery 130 (e.g., DC power), and output the converted electric power to the battery 130. The electric power for the external electric power supply is supplied from the battery 130 to the charger-discharger 120. The charger-discharger 120 is configured to convert the DC power supplied from the battery 130 into electric power suitable for the external electric power supply (e.g., AC power) and output the converted electric power to the inlet 110. When any of the external charging and the external electric power supply is executed, the charge-discharge relay of the charger-discharger 120 is closed (connected). When neither of the external charging and the external electric power supply is executed, the charge-discharge relay of the charger-discharger 120 is opened (disconnected).

The ECU 150 includes a processor 151, a random access memory (RAM) 152, a storage device 153, and a timer 154. The ECU 150 may be a computer. The processor 151 may be a central processing unit (CPU). The RAM 152 functions as a working memory for temporarily storing the data processed by the processor 151. The storage device 153 is configured to save stored information. The storage device 153 stores, in addition to a program, information to be used in the program (e.g., maps, mathematical formulas, and various parameters). In the present embodiment, as the processor 151 executes the program stored in the storage device 153, various controls in the ECU 150 are executed. The timer 154 is configured to notify the processor 151 of arrival of a set time. The ECU 150 can acquire a current time using a real-time clock (RTC) circuit (not shown) built in the ECU 150.

The vehicle 100 further includes a traveling drive unit 140, a human-machine interface (HMI) 160, a position sensor 170, a communication device 180, and drive wheels W. The HMI 160 includes an input device and a display device. The HMI 160 may include a touch panel display. The HMI 160 may include a smart speaker that receives voice input. The position sensor 170 is configured to detect the position of the vehicle 100 and output the detection result to the ECU 150. The position sensor 170 may be a sensor using the Global Positioning System (GPS). The drive system of the vehicle 100 is not limited to the front wheel drive shown in FIG. 2, and may be rear wheel drive or four-wheel drive.

The traveling drive unit 140 includes a power control unit (PCU) and a motor generator (MG) (neither shown), and is configured to cause the vehicle 100 to travel using the electric power stored in the battery 130. The PCU includes, for example, an inverter, a converter, and a relay (hereinafter referred to as "system main relay (SMR)"). The PCU is controlled by the ECU 150. The MG is, for example, a three-phase AC motor generator. The MG is driven by the PCU and is configured to rotate the drive wheels W. The PCU drives the MG using electric power supplied from the battery 130. Further, the MG is configured to generate regenerative power and supplies the generated electric power to the battery 130. Any desired number of motors (MGs) for traveling may be used. The number of motors (MGs) may be one, two, or three or more. The motor for traveling may be an in-wheel motor. The SMR is configured to switch connection and disconnection of an electric power path from the battery 130 to the PCU. The SMR is closed (connected) when the vehicle 100 is traveling.

The communication device 180 includes various communication interfaces (I/Fs). The ECU 150 is configured to communicate with devices outside the vehicle 100 through the communication device 180. The communication device 180 includes a wireless communication device (e.g., a data communication module (DCM)) that can access the mobile communication network (telematics). The wireless communication device may include a communication I/F compatible with the fifth generation mobile communication system (5G). The vehicle 100 may wirelessly communicate with the server 300 in both the plugged-in state and the plugged-out state. In the present embodiment, the vehicle 100 wirelessly communicates with the server 300 through the mobile communication network without the EVSE. The vehicle 100 receives a command or a notification from the server 300 via the wireless communication device. The vehicle 100 may perform wired communication (communication via the EVSE) with the servers 600 and 700 in the plugged-in state.

A mobile terminal UT is a terminal carried by a user of the vehicle 100. In the present embodiment, a smartphone including a touch panel display is adopted as the mobile terminal UT. However, the mobile terminal UT is not limited to this, and any mobile terminal can be adopted, and a laptop, a tablet terminal, a wearable device (e.g., a smart watch or a smart glass), an electronic key, or the like can also be adopted.

The mobile terminal UT is preregistered in the server 300 and is configured to wirelessly communicate with the server 300. Predetermined application software (hereinafter simply referred to as "application") is installed in the mobile terminal UT. The server 300 performs predetermined authentication before starting communication with a mobile terminal, and communicates only with a mobile terminal that has been authenticated successfully. As a result, unauthorized communication by a mobile terminal that is not registered in the server 300 can be suppressed. The user of the vehicle 100 can start communication with the server 300 by inputting predetermined authentication information (information for successful authentication) into the mobile terminal UT. The input of the predetermined authentication information can be skipped by registering the authentication information in the application. The mobile terminal UT can exchange information with the server 300 through the above application.

In the present embodiment, the mobile terminal UT includes a position sensor. The position sensor may be a sensor using the GPS. The mobile terminal UT transmits information indicating the position of the user (hereinafter also referred to as "user position information") to the server 300 periodically or in response to a request from the server 300.

The mobile terminal UT predicts a travel plan of the vehicle 100 using the user position information. Examples of the travel plan include a ride time (or a departure time), a return time, and a destination (or a travel route to the destination). For example, the mobile terminal UT may predict a time when the user will ride into the vehicle 100 (hereinafter also referred to as "ride time") based on the transition of the user's position after getting out of the vehicle 100. The mobile terminal UT may function as an electronic key for the vehicle 100. When the user locks the doors of the vehicle 100 using the mobile terminal UT after getting out of the vehicle 100, the position of the mobile terminal UT at the time of getting out of the vehicle may be registered in the mobile terminal UT as a parking position of the vehicle 100, and tracking of the user's position by the mobile terminal UT (detection of the position by the position sensor and recording of the user's position) may be started. The mobile terminal UT may learn behavior patterns of the user from history data (e.g., weather information, traffic jam information, and past position data managed separately for the days of week).

The mobile terminal UT transmits the travel plan to the server 300. A travel plan set in the mobile terminal UT by the user may be transmitted from the mobile terminal UT to the server 300. A schedule set in a scheduler application or an alarm application installed in the mobile terminal UT may automatically be transmitted to the server 300. A travel plan set by the user in a navigation system (not shown) of the vehicle 100 may be transmitted to the server 300.

A vehicle system including the ECU 150 (a system that controls the vehicle 100) is turned ON (operated) or OFF (stopped) when the user operates a start switch (not shown). The start switch of the vehicle 100 is a switch for starting the vehicle system. The vehicle system (including the ECU 150) is started when the start switch is turned ON. When the start switch is turned OFF while the vehicle system is operating, the vehicle system is stopped. In the vehicle 100 that is traveling, however, turning OFF the start switch is prohibited. In general, the start switch is called "power switch" or "ignition switch".

The configuration of the vehicle 100 described above is merely an example. In the above example, AC power is supplied from the power grid PG to the vehicle 100 via the EVSE 200, the AC power is converted into DC power by the charger-discharger 120, and the DC power is input to the battery 130. The function of the charger-discharger 120 may be mounted on the EVSE instead of the vehicle. The charger-discharger may be built in the connector of the charging cable. The EVSE may convert AC power supplied from the power grid into DC power and output the DC power to the vehicle.

Referring to FIG. 1 again, the server 600 is a computer that belongs to an aggregator (hereinafter sometimes referred to as "aggregator server"). The aggregator is an electricity provider that provides the energy management service by bundling a plurality of distributed energy resources (hereinafter also referred to as "DERs"). Each vehicle in the vehicle group VG can function as the DER. The server 600 may cause the DERs (including the vehicle group VG) to function as virtual power plants (VPPs) by remotely and centrally controlling the DERs. The VPP is a mechanism that bundles a large number of DERs by advanced energy management technology using Internet of Things (IoT) and causes the DERs to function as if the DERs serve as a single power plant by remotely and centrally controlling the DERs. The server 600 may perform a demand response (DR) for each DER.

The server 600 can cause the DER (e.g., the battery 130 shown in FIG. 2) to charge or discharge for power balancing of the power grid PG by remote control. For example, when an imbalance described later occurs, the server 600 controls the DER (e.g., the charger-discharger 120 shown in FIG. 2) to eliminate the imbalance. In the present embodiment, each vehicle (target vehicle) in the vehicle group VG is configured to communicate not only with the servers 300 and 600 but also with the server 700. The target vehicle may also be remotely controlled by the server 700 instead of the server 600.

Figure 3:
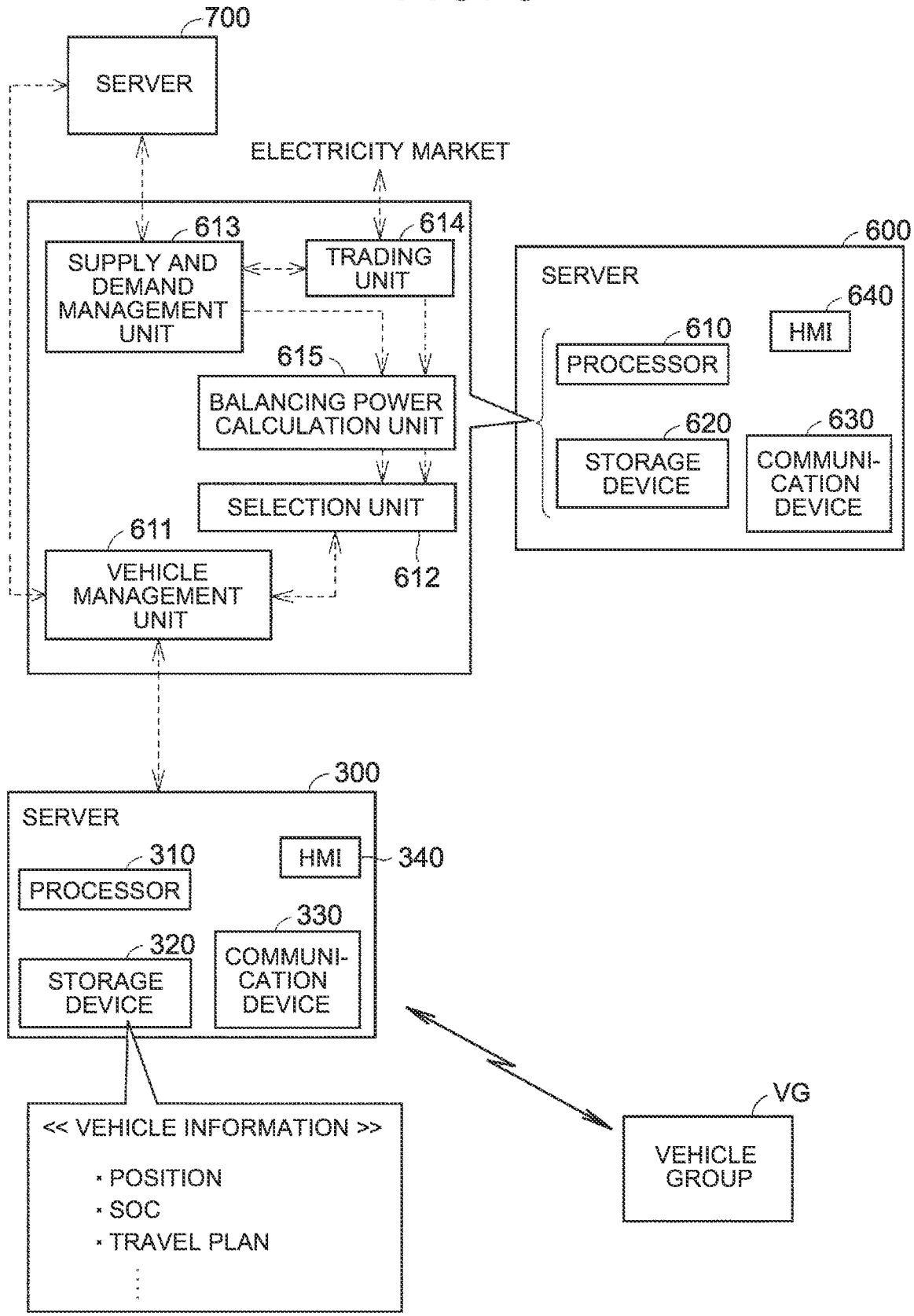
FIG. 3 is a diagram showing detailed configurations of first and second management computers according to the embodiment of the present disclosure.

FIG. 3 is a diagram showing detailed configurations of the servers 300 and 600. Referring to FIG. 3, the servers 300 and 600 include processors 310 and 610, storage devices 320 and 620, communication devices 330 and 630, and HMIs 340 and 640, respectively. The number of processors (e.g., CPUs) mounted on one server is arbitrary, and may be one or more. The storage devices 320 and 620 are configured to store various types of information. In addition to the programs executed by the processors 310 and 610, the storage devices 320 and 620 store information used in the programs (e.g., maps, mathematical formulas, and various parameters). The communication devices 330 and 630 include various communication interfaces (I/Fs). Each of the HMIs 340 and 640 includes an input device and a display device. Each of the HMIs 340 and 640 may include a touch panel display.

The server 300 is configured to manage information about each vehicle in the vehicle group VG (hereinafter also referred to as "vehicle information"). The vehicle information is stored in the storage device 320 of the server 300. Specifically, identification information for identifying the vehicle (vehicle ID) is assigned to each vehicle, and the server 300 manages the vehicle information by distinguishing the vehicle information by the vehicle ID. The vehicle ID may be a number unique to each vehicle (e.g., a vehicle identification number (VIN)) or a communication address of the vehicle. The vehicle information includes, for example, the position of the vehicle, the SOC of the power storage device provided in the vehicle, the travel plan of the vehicle, the grid connection state (plugged-in state or plugged-out state), and the state of the vehicle system (ON/OFF). Further, specifications of the vehicle (e.g., specifications related to charge and discharge) may be preregistered in the server 300.

In the present embodiment, each vehicle in the vehicle group VG is the target vehicle. The latest grid connection state is transmitted from the target vehicle to the server 300 at a timing when the target vehicle switches the plugged-in state and the plugged-out state. The latest state of the vehicle system is transmitted from the target vehicle to the server 300 at a timing when the vehicle system is turned ON or OFF in the target vehicle. The latest travel plan is transmitted from the mobile terminal carried by the user of the target vehicle (or from the target vehicle) to the server 300 at a timing when the travel plan of the target vehicle is changed.

The server 300 is configured to periodically communicate with each target vehicle. Specifically, the server 300 repeatedly executes a process shown in FIG. 4 described below. The vehicle information is also transmitted from the target vehicle to the server 300 by such periodic communication.

Figure 4:
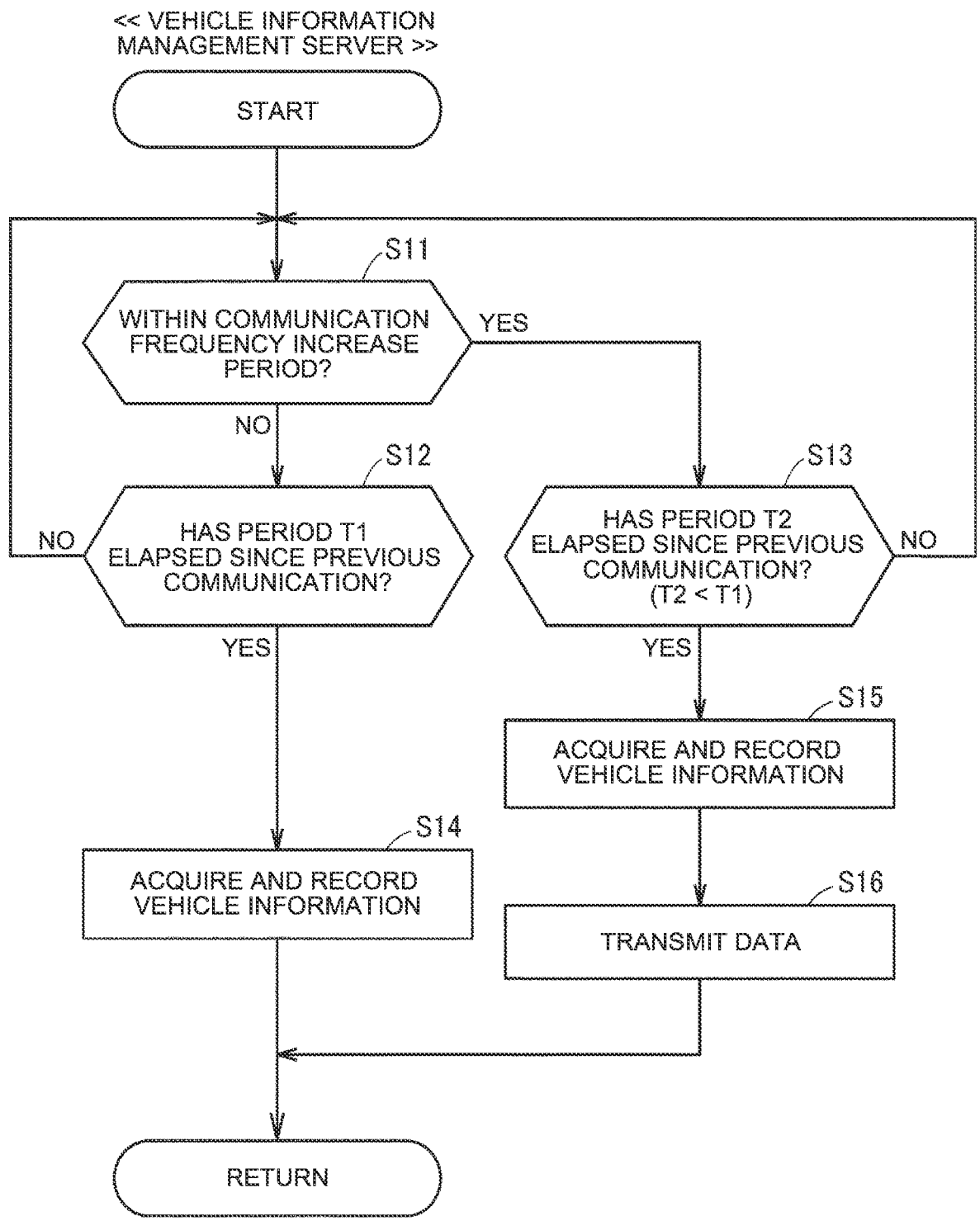
FIG. 4 is a flowchart showing a process related to communication with the target vehicle that is executed by the first management computer shown in FIG. 3.

FIG. 4 is a flowchart showing a process related to communication with the target vehicle that is executed by the server 300. The process shown in the flowchart is executed for each target vehicle. The server 300 repeatedly executes the process shown in FIG. 4 for each target vehicle. In the present embodiment, the series of processes shown in FIG. 4 is executed by the processor 310 executing the program stored in the storage device 320. The storage device 320 also stores a communication frequency increase flag (a parameter used in the process shown in FIG. 4). Hereinafter, each step in the flowchart is simply represented by "S".

Referring to FIG. 4 together with FIGS. 1 to 3, the server 300 determines in S11 whether a communication frequency increase period is currently applied. Specifically, the server 300 determines whether the communication frequency increase period is currently applied based on a value of the communication frequency increase flag (see FIGS. 7 to 9) described later. In the present embodiment, periods T10, T20, and T30 described later are communication frequency increase periods (see FIG. 5). The communication frequency increase flag that is ON means that the communication frequency increase period is currently applied. The communication frequency increase flag that is OFF means that the communication frequency increase period is not applied.

When the communication frequency increase period is not applied (NO in S11), the server 300 determines in S12 whether a predetermined period T1 has elapsed since the previous communication. The period T1 is a communication cycle (communication interval) outside the communication frequency increase period (within another period). In the present embodiment, the period T1 is set to one hour. As a result, communication between the server 300 and the target vehicle is performed at a frequency of about once per hour outside the communication frequency increase period. The period T1 is not limited to this, and may be longer than one hour.

When the communication frequency increase period is currently applied (YES in S11), the server 300 determines in S13 whether a predetermined period T2 has elapsed since the previous communication. The period T2 is a communication cycle (communication interval) within the communication frequency increase period (within any of the periods T10, T20, and T30 described later). The period T2 is set to a period shorter than the period T1. In the present embodiment, the period T2 is set to 30 minutes. As a result, communication between the server 300 and the target vehicle is performed at a frequency of about twice per hour within the communication frequency increase period. The period T2 is not limited to this, and may be shorter than 30 minutes (e.g., 10 minutes, 15 minutes, or 20 minutes).

When the communication cycle is switched, the server 300 may gradually change the communication cycle. For example, when the communication cycle is switched from the period T1 to the period T2, the server 300 may gradually change the communication cycle from the period T1 to the period T2 so that the processing load on the processor 310 does not increase excessively. The communication cycle may be adjusted in the communication device 330 so that the communication cycle does not change abruptly.

When determination is made in S12 that the period T1 has not elapsed since the previous communication (NO in S12), the process returns to S11. When determination is made in S13 that the period T2 has not elapsed since the previous communication (NO in S13), the process also returns to S11. The determination of NO in either S12 or S13 means that the timing to communicate with the target vehicle has not come. The determination of YES in either S12 or S13 means that the timing to communicate with the target vehicle has come.

When the determination is YES in S12, the server 300 communicates with the target vehicle to acquire vehicle information from the target vehicle in S14. The server 300 stores the acquired vehicle information in the storage device 320. The vehicle information transmitted from the target vehicle to the server 300 in S14 includes the position of the target vehicle and the SOC of the power storage device provided in the target vehicle. For example, the latest position (e.g., longitude and latitude) detected by the position sensor 170 and the latest SOC detected by the monitoring module 131 in the vehicle 100 shown in FIG. 2 are transmitted to the server 300. The SOC indicates the remaining amount of electric power stored in the power storage device, and represents, for example, the ratio of the current power storage amount to the full charge capacity (the power storage amount in a fully charged state) from 0% to 100%. In S14, the server 300 may also acquire the vehicle information related to the target vehicle (e.g., the travel plan) from the mobile terminal UT (FIG. 2), and store the vehicle information in the storage device 320 together with the vehicle information acquired from the target vehicle. In the storage device 320, the server 300 may manage the data separately for each acquisition time so that the acquisition time can be known. When the process in S14 is executed, the process returns to the first step (S11). The server 300 transmits the data held by itself to the server 600 in response to a request from the server 600.

When the determination is YES in S13, the server 300 communicates with the target vehicle to acquire vehicle information from the target vehicle in S15 as in S14. The server 300 stores the acquired vehicle information in the storage device 320. The server 300 also acquires the vehicle information related to the target vehicle (e.g., the travel plan and the user position information) from the mobile terminal UT, and stores the vehicle information in the storage device 320 together with the vehicle information acquired from the target vehicle. Subsequently, the server 300 transmits the latest data held by itself to the server 600 in S16. The vehicle information transmitted from the server 300 to the server 600 in S16 includes the position of the target vehicle, the SOC of the power storage device provided in the target vehicle, the travel plan, the state of the vehicle system, the grid connection state, and the user position information. In this manner, the server 300 transmits the latest vehicle information to the server 600 without waiting for the request from the server 600 within the communication frequency increase period. When the process in S16 is executed, the process returns to the first step (S11).

The server 300 transmits, for example, a request signal (polling signal) to the target vehicle in each of S14 and S15. The target vehicle transmits the vehicle information to the server 300 in response to the request signal. When the communication frequency is increased (YES in S11), the transmission interval of the request signal is made shorter than in the normal period (NO in S11). The transmission interval is not limited to this, and the vehicle information may be transmitted from the target vehicle to the server 300 with a predetermined interval. When the communication frequency is increased (YES in S11), the server 300 may transmit a communication frequency increase request to the target vehicle. The target vehicle may shorten the predetermined interval when receiving the communication frequency increase request from the server 300.

Figure 5:
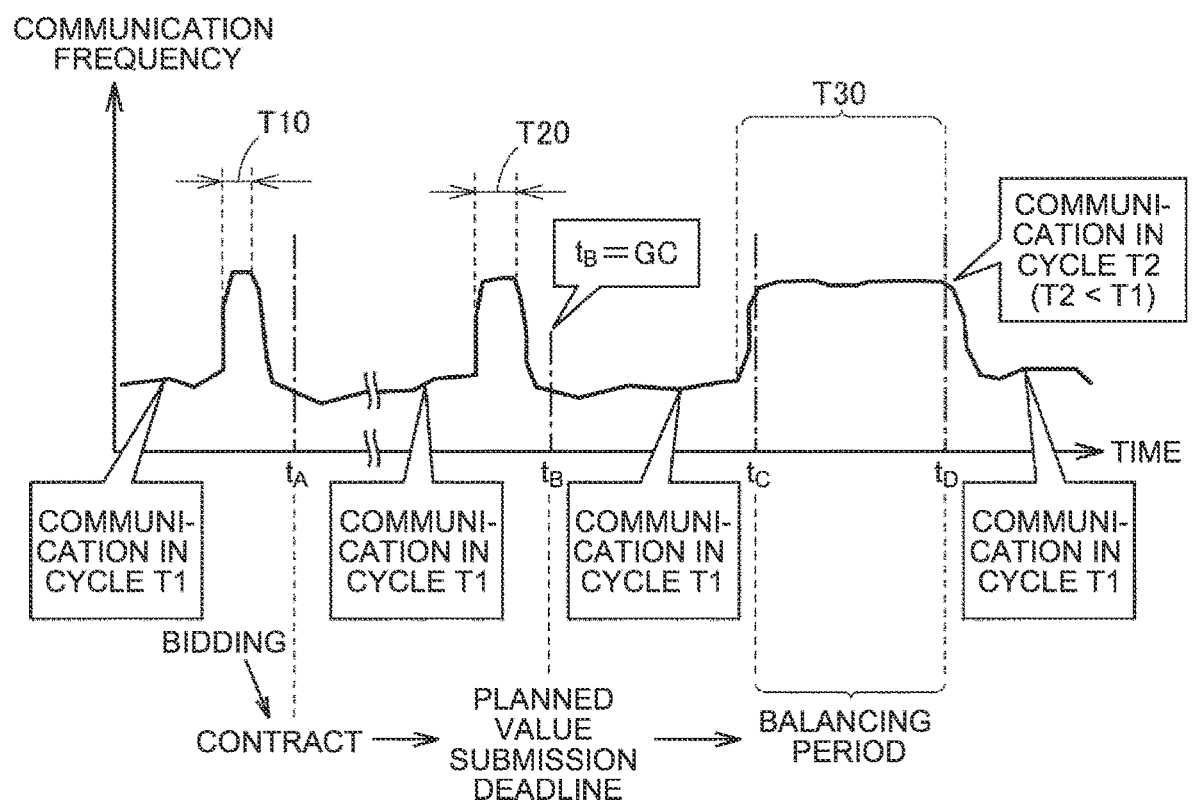
FIG. 5 is a diagram illustrating communication frequency control in a vehicle management method according to the embodiment of the present disclosure.

FIG. 5 is a diagram illustrating communication frequency control in a vehicle management method according to the present embodiment.

Referring to FIG. 5 together with FIGS. 1 to 3, the vehicle management device 1000 (more specifically, the server 300) is configured to periodically communicate with each vehicle in the vehicle group VG (see FIG. 4). In the periods T10, T20, and T30 shown in FIG. 5, the vehicle management device 1000 communicates with the target vehicle at a frequency higher than the average communication frequency in other periods (periods excluding the periods T10, T20, and T30). Specifically, the periods T10, T20, and T30 are the communication frequency increase periods. Within the communication frequency increase period, the server 600 requests the server 300 to turn ON the communication frequency increase flag. As a result, the frequency of communication between the server 300 and the target vehicle becomes higher than the normal communication frequency (see FIG. 4). Outside the communication frequency increase period, the server 600 requests the server 300 to turn OFF the communication frequency increase flag. As a result, the frequency of communication between the server 300 and the target vehicle returns to the normal communication frequency (see FIG. 4). Through the above control, a peak of the communication frequency (maximum frequency) is formed in each of the periods T10, T20, and T30. The periods T10, T20, and T30 are examples of a "first period", a "second period", and a "third period" according to the present disclosure, respectively.

A timing $t_A$ (hereinafter referred to as "$t_A$") shown in FIG. 5 is a contract timing. Before the $t_A$, a bid is made in the electricity market described later (see FIG. 6), and a contract is made when the bid is won. The period T10 is a period immediately before the $t_A$. The period T10 is set to, for example, at least a part of a period from a timing that is three hours before the contract to the contract timing. In the present embodiment, a period from a timing that is one hour before the bidding to the bidding timing is defined as the period T10. The period from making a bid to winning the bid (contract) is, for example, about one hour.

A timing $t_B$ (hereinafter referred to as "$t_B$") shown in FIG. 5 is a supply and demand planned value submission deadline (e.g., GC described later). The period T20 is a period immediately before the $t_B$. The period T20 is set to, for example, at least a part of a period from a timing that is three hours before the $t_B$ to the $t_B$. In the present embodiment, a period from a timing that is one hour and 30 minutes before the $t_B$ to a timing that is 30 minutes before the $t_B$ is defined as the period T20.

A period from a timing $t_C$ (hereinafter referred to as "$t_C$") to a timing $t_D$ (hereinafter referred to as "$t_D$") shown in FIG. 5 is a balancing period (a period in which provision of a balancing power is requested). The period T30 is set, for example, within a period obtained by adding a margin period (a period of 30 minutes or less) to at least one of parts before and after the balancing period ($t_C$ to $t_D$). In the present embodiment, a period from a timing that is 30 minutes before the $t_C$ to the $t_D$ is defined as the period T30. In the present embodiment, the period T30 is a period obtained by adding a 30-minute margin period to the part before the balancing period of the balancing power awarded by winning the bid.

In the present embodiment, the average frequency of communication between the server 300 and the target vehicle (hereinafter simply referred to as "average communication frequency") increases in each of the periods T10, T20, and T30. The average communication frequency in each of the periods T10, T20, and T30 is about twice per hour, and the average communication frequency in the other periods (periods excluding the periods T10, T20, and T30) is about once per hour. The average communication frequency in each of a first intermediate period (a period from the end of the period T10 to the start of the period T20) and a second intermediate period (a period from the end of the period T20 to the start of the period T30) is also about once per hour. In the present embodiment, the frequency of about once per hour is a normal average communication frequency. The server 300 doubles the average communication frequency in each of the periods T10, T20, and T30 as compared with the normal average communication frequency.

Referring to FIG. 3 again, in the present embodiment, the server 600 includes a vehicle management unit 611, a selection unit 612, a supply and demand management unit 613, a trading unit 614, and a balancing power calculation unit 615 described below. These units are embodied by, for example, the processor 610 and a program executed by the processor 610. However, the present disclosure is not limited to this, and each unit may be embodied by dedicated hardware (electronic circuit).

The vehicle management unit 611 is configured to acquire data managed by the server 300 as necessary. The vehicle management unit 611 is configured to predict future behavior of the vehicle based on the data acquired from the server 300. The vehicle management unit 611 is configured to request the server 300 to change the value of the communication frequency increase flag at a predetermined timing (e.g., see FIGS. 7 to 9 described later).

The vehicle management unit 611 is configured to cause a vehicle selected by the selection unit 612 to operate as a balancing power for the power grid PG by remote control. When the selected vehicle is controlled by the server 700, the vehicle management unit 611 notifies the server 700 about the vehicle selected by the selection unit 612. The vehicle management unit 611 may control the vehicle in response to a command from the server 700.

The supply and demand management unit 613 is configured to acquire supply and demand information of the power grid PG from the server 700. The supply and demand management unit 613 monitors actual supply and demand of the power grid PG. The actual supply and demand of the power grid PG may be measured by a watt-hour meter provided for each DER, or may be measured by a common carriage measuring instrument. The watt-hour meter for each DER may include a smart meter or a watt-hour meter built in the EVSE. When an imbalance occurs in terms of power balancing of the power grid PG, the supply and demand management unit 613 generates a balancing power request to eliminate the imbalance.

The trading unit 614 is configured to make trades in the electricity market. The trading unit 614 executes bidding in the electricity market and notifies the supply and demand management unit 613 about the bidding result. When the trading unit 614 wins the bid for the balancing power in the electricity market, the trading unit 614 generates the balancing power request.

The balancing power calculation unit 615 is configured to calculate a target balancing power for the balancing power request. In the present embodiment, the balancing power calculation unit 615 determines, as the target balancing power, a value obtained by adding a predetermined margin (kW) to the balancing power (kW) requested in a balancing period of the balancing power request.

The selection unit 612 is configured to select a vehicle from the vehicle group VG in response to the balancing power request. The vehicle selection is a process of selecting a vehicle to be operated as a balancing power from among the vehicles in the vehicle group VG. The selection unit 612 notifies the vehicle management unit 611 about the selected vehicle.

Figure 6:
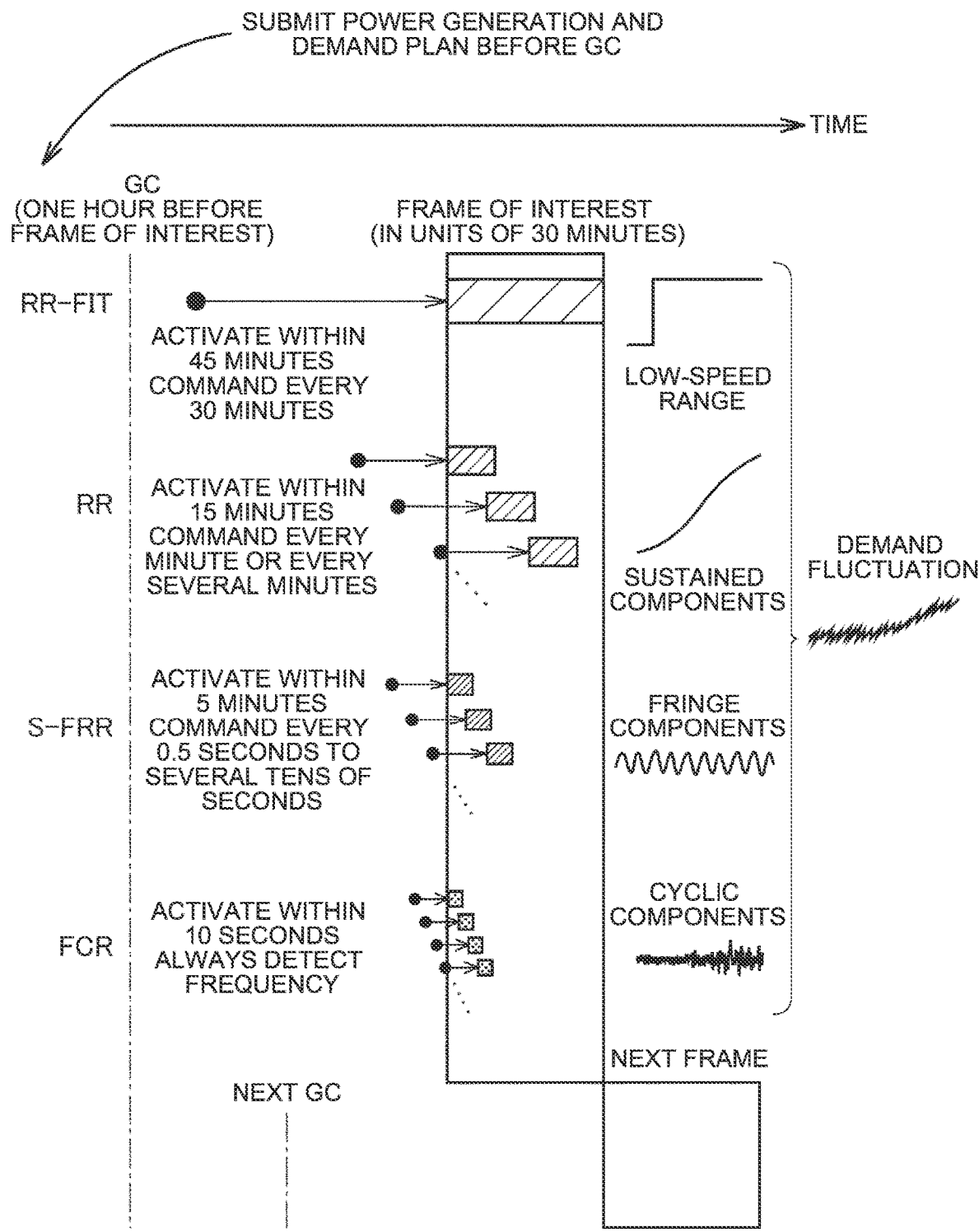
FIG. 6 is a diagram showing an outline of an electricity market according to the embodiment of the present disclosure.

FIG. 6 is a diagram showing an outline of the electricity market according to the present embodiment. The electricity market according to the present embodiment will be described below with reference to FIG. 6. The electricity market described below is merely an example.

A balancing group (BG) that uses the power grid PG is responsible for achieving the power balancing. The BG is a balance responsible party (BRP). Examples of the BG include a retail electric power company, a power generation company, and an aggregator. The planned value power balancing system is used in the present embodiment. The BG submits a planned value for each frame to a predetermined institution in advance. The "frame" is one of frames of unit time into which one day is divided. In the present embodiment, the frame length (unit time) is 30 minutes. The predetermined institution may be Organization for Cross-regional Coordination of Transmission Operators, JAPAN (OCCTO). An imbalance (discrepancy from the planned value) in terms of the power balancing is evaluated for each frame. The BG that has caused an imbalance is obliged to pay an imbalance charge (penalty). A BG that frequently causes an imbalance may have its license revoked.

The electricity market according to the present embodiment includes a spot market (day-ahead market), an hour-ahead market (intraday market), a supply and demand balancing market, and a capacity market. The spot market and the hour-ahead market are opened and operated by a wholesale electric power exchange such as the Japan Electric Power Exchange (JEPX). In each market, electric power is traded as a product. Each product is bought and sold by, for example, bidding. In each market, the product is traded on a frame basis. In the wholesale electric power exchange, trading is carried out for 48 frames that segment one day in units of 30 minutes. "Gate closing" (GC) in FIG. 6 indicates a market closing time for each frame. The GC is a planned value change deadline (supply and demand planned value submission deadline) in the planned value power balancing system. In the present embodiment, the GC is an hour before the start time of the frame. Before the GC, the BG can use the market to adjust a deviation between the planned value and the actual supply and demand in a frame of interest (frame corresponding to the GC). The BG may procure a balancing power for eliminating the imbalance by demand response (DR).

The supply and demand balancing market is a market for an operator of the power grid PG (hereinafter referred to as "transmission system operator (TSO)") to procure a balancing power. The TSO may be a general electricity transmission and distribution operator. The balancing power gives the power grid PG flexibility (ability to change production or consumption of electric power in response to power fluctuations). After the GC, the TSO balances the supply and demand using the balancing power procured through the supply and demand balancing market. The TSO controls the balancing power (resource) procured in the market by governor-free (GF), load frequency control (LFC), or economic load dispatch control (EDC). This achieves the power balancing of the power grid PG.

The balancing power to be traded in the supply and demand balancing market is roughly divided into a balancing power in normal cases and a balancing power in the event of accident. The balancing power in normal cases is further classified into a balancing power for prediction deviation and a balancing power for in-period fluctuation. The prediction deviation includes a demand prediction deviation and a renewable energy prediction deviation. The prediction deviation is an average deviation (30-minute average deviation) between a planned value and an actual value in each frame. The in-period fluctuation is fluctuation within the frame (shorter than 30 minutes).

The BG predicts demand and submits a demand plan before the GC. However, a prediction deviation (difference between a predicted value and an actual value of power demand) may occur after the GC. The balancing power for demand prediction deviation is a balancing power for eliminating the prediction deviation that occurs after the GC. The balancing power for renewable energy prediction deviation is a balancing power for eliminating the renewable energy prediction deviation (difference between a predicted value and an actual value of renewable energy output) presumed at the time of GC. The TSO mainly uses the LFC and the EDC to control the balancing power for prediction deviation.

Each of the power demand and the renewable energy output changes from moment to moment. Even if the predicted value and the actual value agree with each other in the 30-minute average, small fluctuation occurs in a period shorter than 30 minutes. The balancing power for in-period fluctuation is a balancing power that responds to the in-period fluctuation (fluctuation within less than 30 minutes) so that supply and demand agree with each other. Regarding the control on the balancing power for in-period fluctuation, the TSO responds to fluctuation within less than 1 minute by the GF and responds to fluctuation within 1 minute or more by the LFC or the EDC.

The balancing power in the event of accident is a balancing power for eliminating a difference between demand and supply caused by unpredictable trouble (e.g., power failure). The TSO will procure backup power on the market in case of power failure. Regarding the control on the backup power (balancing power in the event of accident), the TSO responds by the GF immediately after the failure, and then switches to the LFC and the EDC in sequence.

Demand fluctuation can be subdivided into ultra-short-period components (cyclic components), short-period components (fringe components), and long-period components (sustained components).

In the supply and demand balancing market, a balancing power for cyclic components (primary balancing power) and a balancing power for fringe components (secondary balancing power 1) are traded. The primary balancing power is "frequency containment reserve (FCR)". Regarding the FCR, the response period is within 10 seconds and the duration is five minutes. The secondary balancing power 1 is "synchronized frequency restoration reserve (S-FRR)". Regarding the S-FRR, the response period is within five minutes and the duration is 30 minutes (one frame).

In the supply and demand balancing market, a balancing power for a sustained component corresponding to a difference from a previous frame (secondary balancing power 2) and a balancing power for a sustained component that continues from the previous frame (tertiary balancing power 1) are further traded. The secondary balancing power 2 is "frequency restoration reserve (FRR)". Regarding the FRR, the response period is within five minutes and the duration is 30 minutes (one frame). The tertiary balancing power 1 is "replacement reserve (RR)". Regarding the RR, the response period is within 15 minutes and the duration is three hours (six frames).

In the supply and demand balancing market, a balancing power for a special system that is feed-in tariff (FIT) (tertiary balancing power 2) is also traded. Under the FIT system, the TSO is responsible for imbalances in power generation plans. The TSO predicts the renewable energy output two days before the frame and determines a planned power generation value. On a day before the frame, the TSO procures the tertiary balancing power 2 for eliminating the renewable energy prediction deviation (prediction deviation from the value two days before the frame). The tertiary balancing power 2 is "replacement reserve for feed-in tariff (RR-FIT)". Regarding the RR-FIT, the response period is within 45 minutes and the duration is three hours (six frames).

In the capacity market, a power supply I' is traded. The power supply I' is a balancing power (reserve) for responding mainly to severe weather (extreme heat, severe cold, etc.) that may occur about once every 10 years. The power supply I' is always secured as a dedicated power supply of the TSO for a predetermined period. Regarding the power supply I', the response period is within three hours and the duration is two to four hours (four to eight frames).

An entity that has won a bid for the balancing power in the supply and demand balancing market (winning bidder) balances electric power within a range of a won amount (ΔkW contract amount) with respect to a reference value (kW). The winning bidder registers the reference value in the supply and demand balancing market system before the GC (one hour before the start time of the won frame). In the supply and demand balancing market, the reference value is a supply and demand planned value, and the GC is the supply and demand planned value submission deadline. The won amount may be positive (upward balancing power) or negative (downward balancing power). The winning bidder balances electric power in response to a command from the TSO in one or more won frames (providing period). When an output command value is changed during the providing period, the winning bidder changes the output to that value within the response period of the product requirement. When the output command value remains the same during the providing period, the winning bidder maintains the output in response to the command for at least the duration of the product requirement.

The winning bidder notifies the TSO about the resources for use in the power balancing (e.g., a list pattern). The server 700 of the TSO transmits a command to the resources of the winning bidder, for example, by a central power feed command system (central feed system) or a simple command system. The resources may be connected to the central feed system on a dedicated line. For example, when the server 700 controls the vehicle group VG by the command described above, the server 700 may control the vehicles via the server 600 (aggregator) or may directly control the vehicles. After the end of all the won frames, the winning bidder transmits record data of the resources in the frames to the TSO. The TSO checks, in every frame (30 minutes), that the winning bidder maintains a state in which the ΔkW contract amount can be delivered during the providing period (balancing period of the won balancing power) (ΔkW delivery possibility), and that the winning bidder is balancing electric power within the range of the ΔkW contract amount in response to the command (response record). When at least one of assessment of the ΔkW delivery possibility (Assessment I) and assessment of the response record (Assessment II) reveals nonconformity with requirements stipulated for the trading target ΔkW, a predetermined penalty charge is imposed on the winning bidder.

The aggregator conducts electronic commerce using the server 600. The server 600 trades a balancing power in the electricity market. Accounting for market trading is managed by the server 600. When the server 600 wins a bid for the balancing power in the electricity market, the server 600 generates a balancing power request corresponding to the won balancing power. Then, the server 600 selects a vehicle (resource) to be operated as the balancing power from the vehicle group VG in response to the balancing power request. Description will be given of an example in which the server 600 bids in the supply and demand balancing market.

Figure 7:
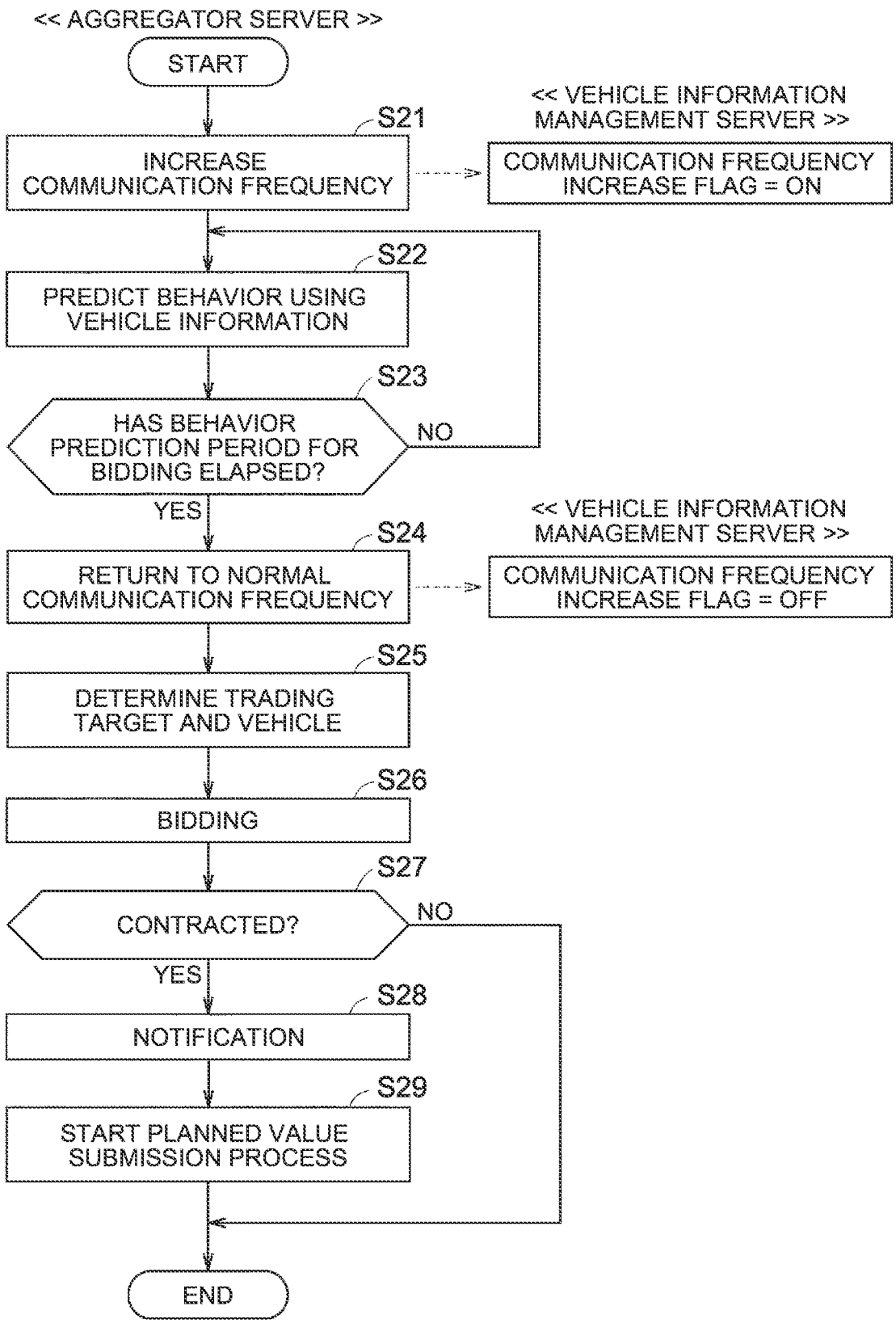
FIG. 7 is a flowchart showing a process related to market trading that is executed by the second management computer shown in FIG. 3.

FIG. 7 is a flowchart showing a process related to market trading that is executed by the server 600. The process shown in this flowchart is executed when a predetermined condition is satisfied. The predetermined condition may be satisfied either at a predetermined time or periodically. The predetermined condition may be satisfied when the server 600 receives a bid instruction from the user. The server 600 may determine a timing suitable for bidding based on at least one of the following pieces of information: market price, weather information (including weather forecast information), and demand history of the vehicle group VG, and execute the process shown in FIG. 7 at the timing suitable for bidding.

Referring to FIG. 7 together with FIGS. 1 to 3, the vehicle management unit 611 increases the frequency of communication between the server 300 and the target vehicle in S21. Specifically, the vehicle management unit 611 requests the server 300 to turn ON the communication frequency increase flag. The server 300 turns ON the communication frequency increase flag in response to the request from the server 600. As a result, the frequency of communication between the server 300 and the target vehicle becomes higher than the normal communication frequency (see FIG. 4).

In S22, the vehicle management unit 611 acquires vehicle information from the server 300, and uses the acquired vehicle information to predict future behavior of each vehicle in the vehicle group VG. In S23, the vehicle management unit 611 determines whether the period T10 (corresponding to a behavior prediction period for bidding) has elapsed. In the present embodiment, a period from the timing when the process in S21 is executed to the timing when one hour elapses is the period T10. The processes in S22 and S23 are repeatedly executed until one hour elapses since the process in S21 was executed (NO in S23).

For example, in an initial processing routine, the vehicle management unit 611 acquires, from the server 300, data up to a predetermined period before the current time (e.g., data accumulated in the server 300 for about the last three hours) in S22. Then, the vehicle management unit 611 predicts the future behavior of the vehicle using the transition of the position and the SOC of the vehicle, the transition of the vehicle user's position, the travel plan of the vehicle, the state of the vehicle system, and the grid connection state. The vehicle management unit 611 estimates a vehicle in the plugged-in state during a predetermined period (e.g., frames corresponding to each product) based on the future behavior of each vehicle in the vehicle group VG. The vehicle management unit 611 also estimates the SOC when the vehicle is in the plugged-in state.

In the second and subsequent processing routines, the vehicle management unit 611 checks in S22 whether the latest data (see S16 in FIG. 4) has been received from the server 300. When the latest data has been received from the server 300, the vehicle management unit 611 predicts the future behavior of each vehicle in the vehicle group VG using the latest data. That is, the server 300 corrects the previous prediction based on the latest data. The accuracy of behavior prediction is improved with the latest data for behavior prediction.

When one hour has elapsed since the process in S21 was executed (YES in S23), the process proceeds to S24. In S24, the vehicle management unit 611 reduces the frequency of communication between the server 300 and the target vehicle. Specifically, the vehicle management unit 611 requests the server 300 to turn OFF the communication frequency increase flag. The server 300 turns OFF the communication frequency increase flag in response to the request from the server 600. As a result, the frequency of communication between the server 300 and the target vehicle returns to the normal communication frequency (see FIG. 4).

In S25, the trading unit 614 selects a trading target (product for bidding) using the result of the behavior prediction (S22) described above. Then, the balancing power calculation unit 615 calculates a target balancing power for the trading target. The selection unit 612 selects a vehicle to be operated as the balancing power requested by the trading target. The selection unit 612 selects, from the vehicle group VG, one or more vehicles for providing the balancing power requested by the trading target during the balancing period using the result of the behavior prediction (S22) described above. The selection unit 612 selects a vehicle in the plugged-in state during at least a part of the balancing period. The selection unit 612 selects a vehicle to secure the target balancing power during the balancing period. The selection unit 612 predicts the balancing power that can be provided by each vehicle in the vehicle group VG using the result of the behavior prediction (S22) described above. The selection unit 612 may estimate a duration (chargeable period or dischargeable period) during which the vehicle can provide the balancing power in the balancing period using the SOC when the vehicle is in the plugged-in state. When one vehicle cannot cover the entire balancing period of the trading target, the balancing period is divided and assigned to a plurality of vehicles.

In S26, the trading unit 614 makes a bid for the trading target selected in S25. Then, the trading unit 614 determines in S27 whether the bid product (balancing power) has been won. When the bid product has not been won (NO in S27), the series of processes shown in FIG. 7 is terminated. When the bid product has been won (YES in S27), the process proceeds to S28.

In S28, the vehicle management unit 611 notifies the server 700 about the vehicle (list pattern) selected by the selection unit 612 for the won product together with the information (e.g., product ID) for identifying the product. The vehicle management unit 611 may notify the server 700 about at least one of a communication address of the selected vehicle, maximum charging power, a chargeable period, maximum discharging power, and a dischargeable period.

In S28, the vehicle management unit 611 notifies a user terminal of the vehicle selected by the selection unit 612 about the period assigned to the vehicle (balancing start time and balancing end time). In this way, the vehicle management device 1000 makes a bid for the balancing power in the electricity market (S26), and sends a notification (S28) to cause one or more vehicles selected from among the target vehicles to operate as the balancing power contracted in the electricity market. The user terminal may be a terminal mounted on the vehicle or a mobile terminal carried by the vehicle user. After the process in S28 is executed, the server 600 starts a planned value submission process (series of processes shown in FIG. 8) in S29. Then, the series of processes shown in FIG. 7 is terminated.

Figure 8:
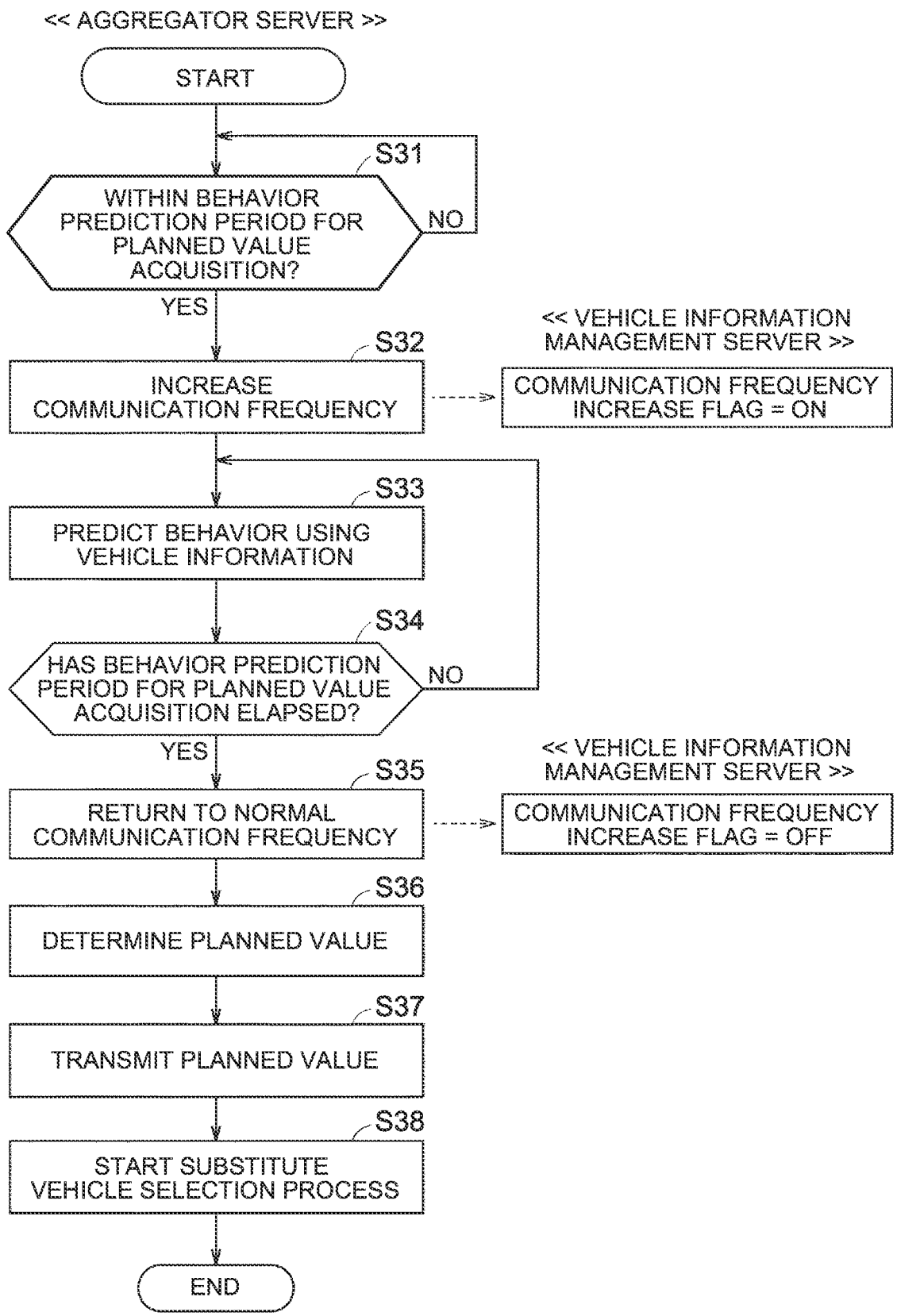
FIG. 8 is a flowchart showing a planned value submission process that is executed by the second management computer shown in FIG. 3.

FIG. 8 is a flowchart showing the planned value submission process that is started by the server 600 in S29 of FIG. 7 when the aggregator makes a contract in the electricity market.

Referring to FIG. 8 together with FIGS. 1 to 3, the vehicle management unit 611 determines in S31 whether the period T20 (corresponding to a behavior prediction period for planned value acquisition) is currently applied. In the present embodiment, the period T20 is determined based on the GC (supply and demand planned value submission deadline) of the contracted product. Specifically, a period from a timing that is one hour and 30 minutes before the GC to a timing that is 30 minutes before the GC is the period T20. Until the period T20 is applied (NO in S31), the determination of S31 is repeatedly executed. When the period T20 is applied (YES in S31), the process proceeds to S32.

In S32, the vehicle management unit 611 increases the frequency of communication between the server 300 and the target vehicle, for example, as in S21 of FIG. 7. In S33, the vehicle management unit 611 acquires vehicle information from the server 300, and uses the acquired vehicle information to predict future behavior of each vehicle in the vehicle group VG. In S34, the vehicle management unit 611 determines whether the period T20 has elapsed. Until the period T20 elapses (NO in S34), the processes in S33 and S34 are repeatedly executed. The behavior prediction in S33 is performed in a manner similar to that in, for example, S22 of FIG. 7.

When the period T20 has elapsed (YES in S34), the process proceeds to S35. The elapse of the period T20 means that the current time is 30 minutes before the GC. In S35, the vehicle management unit 611 reduces the frequency of communication between the server 300 and the target vehicle, for example, as in S24 of FIG. 7.

In S36, the supply and demand management unit 613 determines a supply and demand planned value (the reference value described above) for the contracted product using the result of the behavior prediction (S33) described above. In S37, the supply and demand management unit 613 transmits the determined supply and demand planned value to a predetermined institution (e.g., the supply and demand balancing market system). In this way, the vehicle management device 1000 determines the supply and demand planned value using the information acquired from the target vehicle through the communication (S36), and transmits the determined supply and demand planned value by the supply and demand planned value submission deadline (S37). After the process in S37 is executed, the server 600 starts a substitute vehicle selection process (series of processes shown in FIG. 9) in S38. Then, the series of processes shown in FIG. 8 is terminated.

Figure 9:
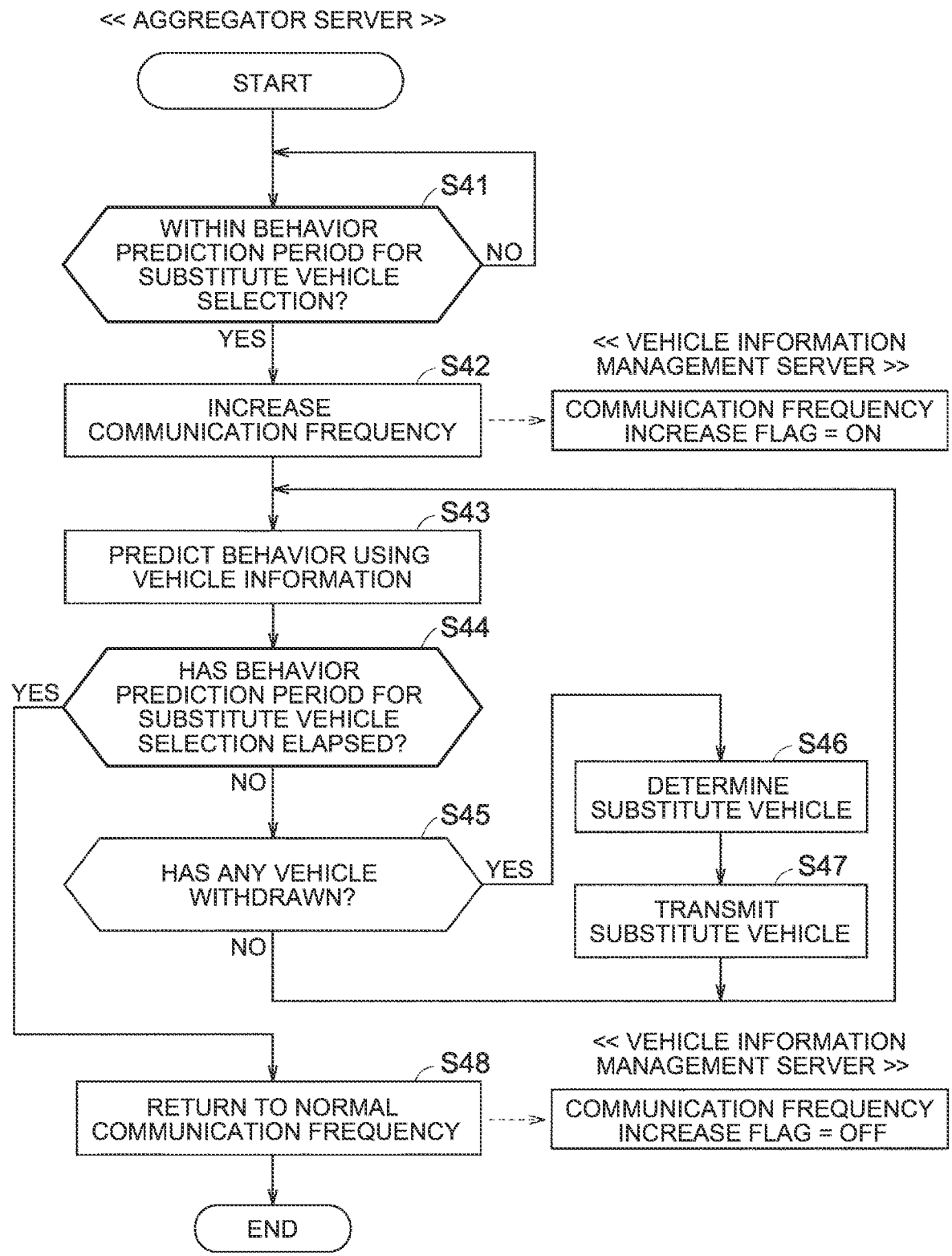
FIG. 9 is a flowchart showing a substitute vehicle selection process that is executed by the second management computer shown in FIG. 3.

FIG. 9 is a flowchart showing the substitute vehicle selection process that is started by the server 600 in S38 of FIG. 8.

Referring to FIG. 9 together with FIGS. 1 to 3, the vehicle management unit 611 determines in S41 whether the period T30 (corresponding to a behavior prediction period for substitute vehicle selection) is currently applied. In the present embodiment, the period T30 is determined based on the balancing period of the contracted product. Specifically, a period obtained by adding 30 minutes (margin period) to the part before the balancing period is the period T30. Until the period T30 is applied (NO in S41), the determination of S41 is repeatedly executed. When the period T30 is applied (YES in S41), the process proceeds to S42.

In S42, the vehicle management unit 611 increases the frequency of communication between the server 300 and the target vehicle, for example, as in S21 of FIG. 7. In S43, the vehicle management unit 611 acquires vehicle information from the server 300, and uses the acquired vehicle information to predict future behavior of each vehicle in the vehicle group VG. In S44, the vehicle management unit 611 determines whether the period T30 has elapsed. Within the period T30 (NO in S44), the process proceeds to S45.

In S45, the vehicle management unit 611 determines whether there is a vehicle that has withdrawn from the power balancing for the contracted product. Specifically, the vehicle management unit 611 uses the vehicle information acquired from the server 300 in S43 to determine whether each vehicle selected for the contracted product can operate as the balancing power as planned during the balancing period. When there is a vehicle determined to be unable to operate as the balancing power as planned during the balancing period (or not operating as the balancing power during the balancing period), the vehicle management unit 611 recognizes the vehicle as the vehicle that has withdrawn from the power balancing. When determination is made that all the vehicles selected for the contracted product can operate as the balancing power as planned during the balancing period (or all the vehicles are currently operating as the balancing power during the balancing period), the vehicle management unit 611 determines that there is no vehicle that has withdrawn from the power balancing (NO in S45), and returns the process to S43.

When any of the selected vehicles has withdrawn from the power balancing (YES in S45), the selection unit 612 selects a substitute vehicle (i.e., a vehicle serving as a substitute for the withdrawn vehicle) in S46. The selection unit 612 selects a vehicle operable as the balancing power in place of the withdrawn vehicle using the result of the behavior prediction (S43). Then, the vehicle management unit 611 notifies the server 700 about the selected vehicle in S47. The vehicle management unit 611 may transmit a communication address of the selected vehicle and specifications related to charging and discharging to the server 700. The vehicle management unit 611 also notifies the user terminal of the selected vehicle about a period assigned to the vehicle. In this way, the vehicle management device 1000 determines whether all of the one or more vehicles selected from among the target vehicles operate as the balancing power for the power grid PG during the period T30. When determination is made that any of the one or more vehicles selected from among the target vehicles does not operate as the balancing power for the power grid PG, the vehicle management device 1000 selects a substitute vehicle from among the target vehicles using the information acquired from the target vehicles through the communication. After the process in S47, the process returns to S43.

Until the period T30 elapses (NO in S44), the behavior prediction is performed in S43. The behavior prediction in S43 is performed in a manner similar to that in, for example, S22 of FIG. 7. When the period T30 has elapsed (YES in S44), the process proceeds to S48. The elapse of the period T30 means that the balancing period for the contracted product has ended. In S48, the vehicle management unit 611 reduces the frequency of communication between the server 300 and the target vehicle, for example, as in S24 of FIG. 7. When the process in S48 is executed, the series of processes shown in FIG. 9 is terminated.

Figure 10:
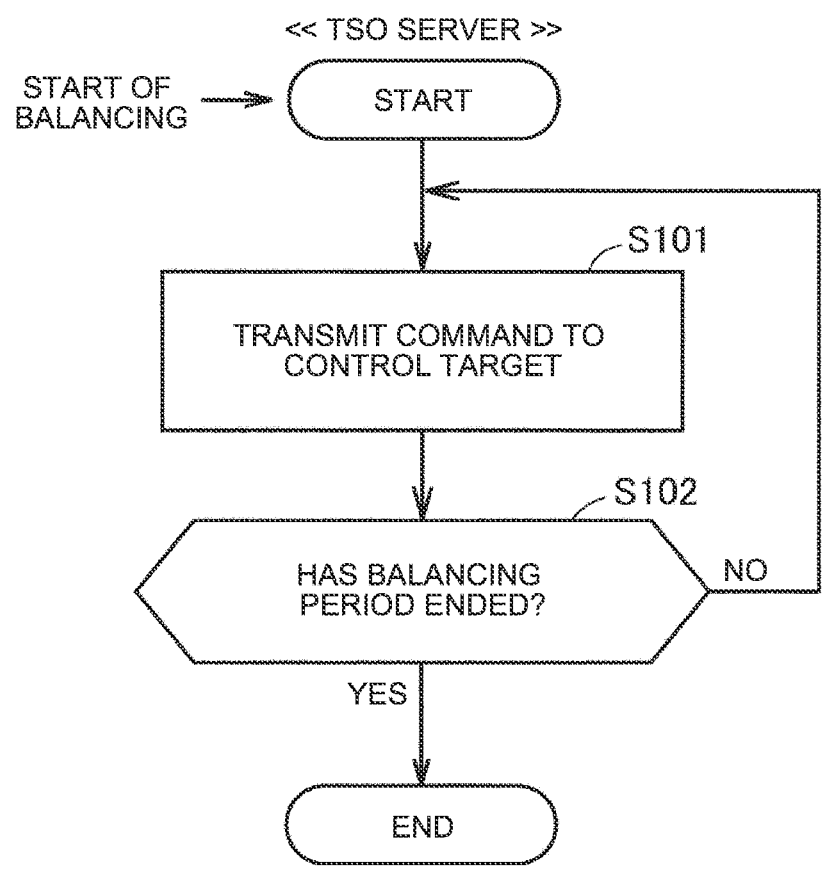
FIG. 10 is a flowchart showing a process related to power balancing that is executed by a TSO server shown in FIG. 1.

The server 700 (TSO server) balances electric power in the power grid PG using the balancing power (won product) secured in the supply and demand balancing market. Specifically, the server 700 controls the vehicle (resource) selected for the product based on the notification from the server 600 (S28 in FIG. 7). FIG. 10 is a flowchart showing a process related to power balancing that is executed by the server 700. The process shown in this flowchart is started when the balancing start time (corresponding to $t_C$ shown in FIG. 5) of the won product has come.

Referring to FIG. 10 together with FIGS. 1 to 3, in S101, the server 700 generates a command to request a control target to balance electric power within the range of the ΔkW contract amount based on a supply and demand status of the power grid PG, and transmits the generated command to the control target. Specifically, the server 700 transmits, to the control target, a command indicating charging power or discharging power based on the supply and demand status of the power grid PG. In a situation in which the balancing power is not required, the command may be a charging stop command or a discharging stop command indicating power of 0 kW. The control target to be controlled by this command is one or more vehicles in the notification from the server 600 (S28 in FIG. 7). The control target may change midway. For example, when the balancing period of the won product is divided and assigned to a plurality of vehicles, the control target will be switched midway along the balancing period (specifically, at an end timing of a period assigned to a previous vehicle). The charging or discharging is continued by charging or discharging a subsequent vehicle in place of the previous vehicle. When the planned vehicle (control target) has withdrawn, the vehicle (substitute vehicle) shown in the notification by the process in S47 of FIG. 9 serves as the control target in place of the withdrawn vehicle.

The server 700 causes the control target to operate as the balancing power (won product) by remote control. The server 700 controls the power conversion circuit of the control target (e.g., the charger-discharger 120 shown in FIG. 2) based on the command. The charging power or the discharging power of the control target may be controlled continuously to follow target values based on the supply and demand status. Alternatively, the charging power or the discharging power of the control target may be adjusted by duty control in accordance with the command. The vehicle serving as the control target keeps the charge-discharge relay closed (connected) during the assigned period. When the assigned period ends, the charge-discharge relay is opened (disconnected).

In S102, the server 700 determines whether the balancing period of the won product has ended. During the balancing period, the determination is NO in S102, and the process returns to S101. By the process in S101, the power balancing of the power grid PG is performed by the balancing power (one or more selected vehicles) provided by the aggregator. When the balancing end time of the won product has come (YES in S102), the series of processes shown in FIG. 10 is terminated.

In the above example, the server 700 directly controls each vehicle. However, the server 700 may control the vehicle via the server 600 without being limited to such an example. The server 700 may transmit a command to the server 600, and the server 600 may remotely control the vehicle in accordance with the command from the server 700.

The aggregator uses the server 600 to secure the balancing power for eliminating the imbalance in terms of the power balancing of the power grid PG. For example, the supply and demand management unit 613 sequentially determines whether the imbalance (difference between the planned value and the actual supply and demand) in terms of the power balancing of the power grid PG is within a predetermined permissible range during the balancing period of the power balancing. When the imbalance is beyond the permissible range, the supply and demand management unit 613 generates a balancing power request for eliminating the imbalance. Then, the selection unit 612 selects one or more vehicles from the vehicle group VG in response to the balancing power request. Then, the vehicle management unit 611 causes the selected vehicles to operate as the balancing power. The balancing period of the power balancing is 30 minutes (one frame). The vehicle management unit 611 remotely controls the control target (the vehicles selected by the selection unit 612) in a manner similar to that in, for example, the process shown in FIG. 10. The vehicle management unit 611 generates a command (charging command or discharging command) for eliminating the imbalance based on the actual supply and demand in the power grid PG, and transmits the generated command to the control target. The actual supply and demand in the power grid PG during the balancing period is monitored by the supply and demand management unit 613.

The periods T20 and T30 are set for the supply and demand planned value submission deadline and the balancing period of the power balancing, and the planned value submission process (FIG. 8) and the substitute vehicle selection process (FIG. 9) are executed. Since the bid (FIG. 7) is not made for the power balancing for eliminating the imbalance, the server 600 starts the series of processes shown in FIG. 8 at a predetermined timing (a timing when the previous balancing period has ended). The planned value submission process (FIG. 8) and the substitute vehicle selection process (FIG. 9) for the product won (contracted) in the market and the planned value submission process (FIG. 8) and the substitute vehicle selection process (FIG. 9) for the power balancing are executed separately. The periods T20 and T30 of the won product may be different from the periods T20 and T30 of the power balancing.

As described above, the vehicle management method according to the present embodiment includes the processes shown in FIGS. 4 and 7 to 10.

In the process shown in FIG. 4, the server 300 periodically communicates with each vehicle (one or more target vehicles) in the vehicle group VG during a predetermined communication period (constantly in the present embodiment).

In each of S23 in FIGS. 7, S31 and S34 in FIG. 8, and S41 and S44 in FIG. 9, the server 600 determines whether the communication frequency increase period (any of the periods T10, T20, and T30) is currently applied. In the communication frequency increase period (communication frequency increase flag=ON), the server 300 communicates with each vehicle in the vehicle group VG at a frequency higher than the average communication frequency in the communication periods excluding the periods T10, T20, and T30 (see FIG. 4).

In the period T10, the server 600 uses the information acquired from each vehicle in the vehicle group VG through the communication (FIG. 4) to predict the balancing power that can be provided by each vehicle in the vehicle group VG (S22 and S25 of FIG. 7). In the period T20, the server 600 uses the information acquired from each vehicle in the vehicle group VG through the communication (FIG. 4) to determine the supply and demand planned value (S33 and S36 of FIG. 8).

In the process shown in FIG. 10, the server 700 causes one or more vehicles selected from the vehicle group VG to operate as the balancing power for the power grid PG (external power supply) in the period T30. When any of the one or more vehicles selected from the vehicle group VG is not operating as the balancing power for the power grid PG (external power supply) in the period T30 (YES in S45 of FIG. 9), the server 600 uses the information acquired from each vehicle in the vehicle group VG through the communication (FIG. 4) to select a substitute vehicle from the vehicle group VG (S46 of FIG. 9).

According to the vehicle management method of the above embodiment, it is possible to appropriately manage the vehicle to be operated as the balancing power for the external power supply. The power balancing of the external power supply can easily be performed appropriately by the managed vehicle.

In the above embodiment, the same communication cycle (period T2=30 minutes) is used in the periods T10, T20, and T30. However, the communication cycle is not limited to this, and may be changed among the period T10, the period T20, and the period T30. For example, the communication frequency in the period T30 may be higher than the communication frequency in the periods T10 and T20.

Figure 11:
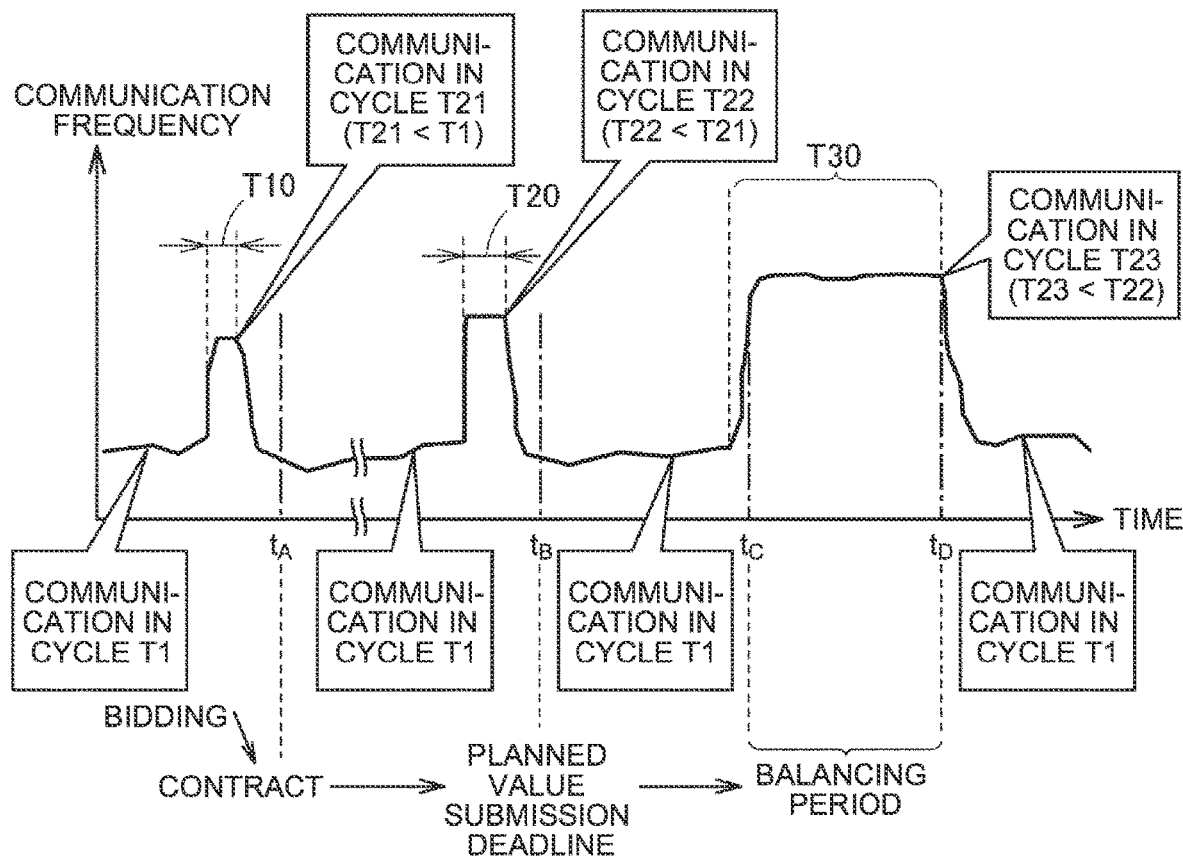
FIG. 11 is a diagram showing a first modification of a communication mode shown in FIG. 5.

FIG. 11 is a diagram showing a first modification of the communication mode shown in FIG. 5. Referring to FIG. 11, in the present modification, the communication cycle in the period T10 is a period T21, the communication cycle in the period T20 is a period T22, the communication cycle in the period T30 is a period T23, and the communication cycle in the other periods is the period T1. The period T21 is shorter than the period T1. The period T22 is shorter than the period T21. The period T23 is shorter than the period T22. In the periods T10, T20, and T30, the server 300 uses the periods T21, T22, and T23 instead of the period T2 in S13 of FIG. 4, respectively. In order for the server 300 to distinguish the periods T10, T20, and T30, the server 600 may transmit values "1", "2", and "3" as the values of the communication frequency increase flag to the server 300 in place of "ON" in S21 of FIG. 7, S32 of FIG. 8, and S42 of FIG. 9.

Figure 12:
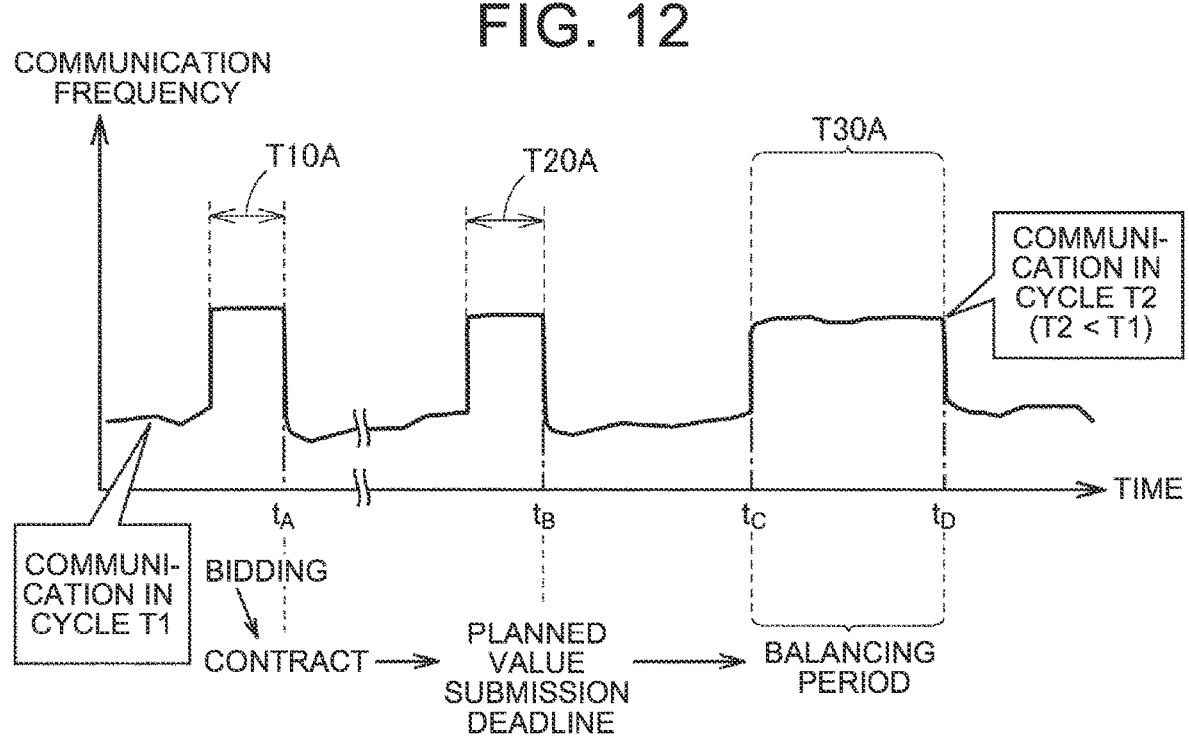
FIG. 12 is a diagram showing a second modification of the communication mode shown in FIG. 5.

The first period, the second period, and the third period are not limited to the above periods T10, T20, and T30, respectively, and can be changed as appropriate. FIG. 12 is a diagram showing a second modification of the communication mode shown in FIG. 5. Referring to FIG. 12, in the present modification, periods T10A, T20A, and T30A are used as the first, second, and third periods, respectively. The period T20A is a period from a timing that is one hour and 30 minutes before the $t_B$ to the $t_B$. The server 600 may determine whether the period T20A has elapsed, for example, in S31 and S34 of FIG. 8 as in the above embodiment. The period T30A is the balancing period ($t_C$ to $t_D$). The server 600 may determine whether the period T30A has elapsed, for example, in S41 and S44 of FIG. 9 as in the above embodiment.

The period T10A is set to at least a part of a period from a timing that is three hours before the contract to the contract timing. That is, determination is made that the period T10A has elapsed at the contract timing. Determination is made that the period T10A has elapsed also when the server 600 has made a bid in the period T10A and three hours have elapsed since the start of the period T10A without contract. In the second modification shown in FIG. 12, the server 600 may execute the process shown in FIG. 13 in place of the process shown in FIG. 7.

Figure 13:
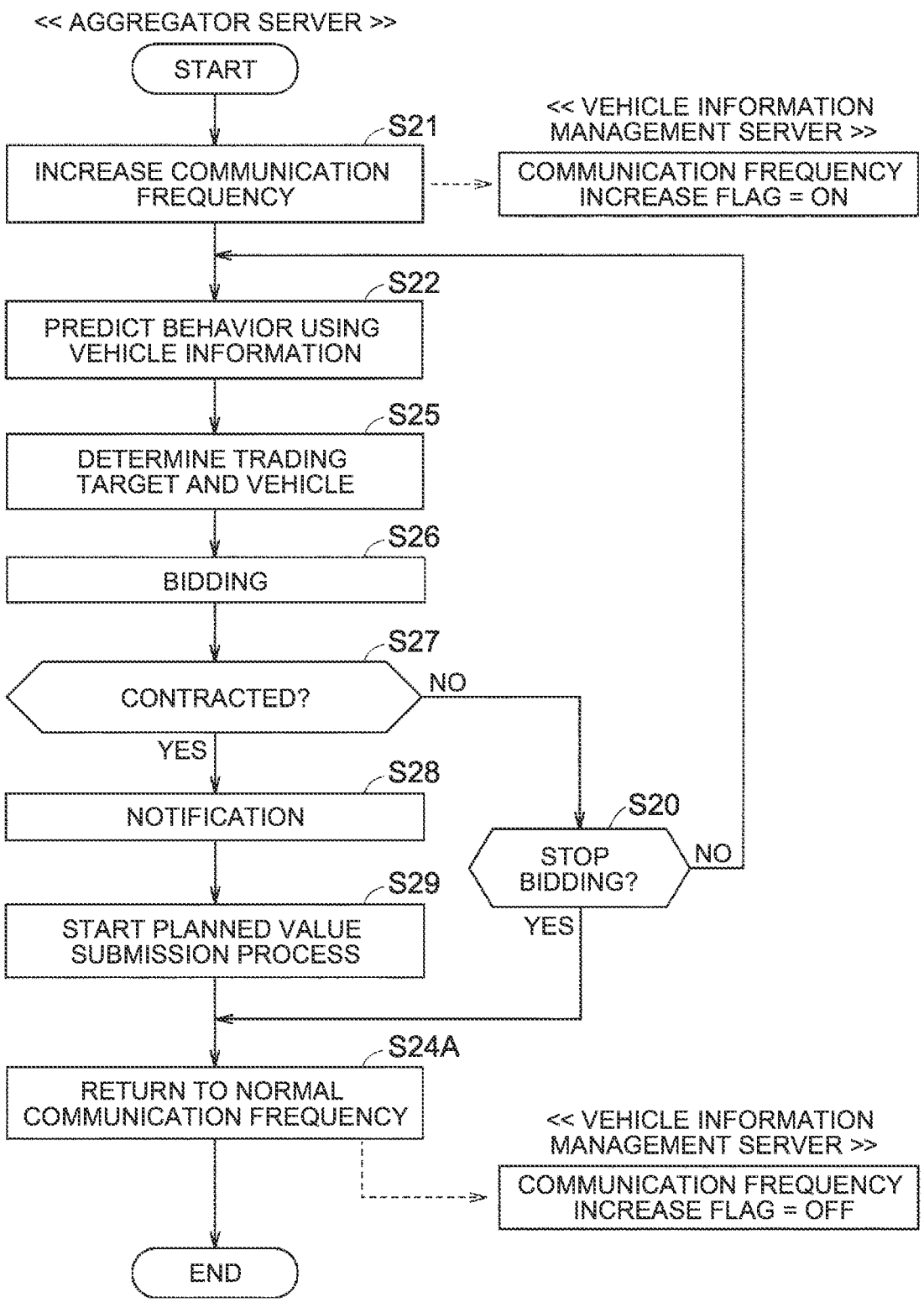
FIG. 13 is a flowchart showing a modification of the process shown in FIG. 7.

FIG. 13 is a flowchart showing a modification of the process shown in FIG. 7. The process shown in this flowchart may be started when the server 600 receives a bid instruction from the user. The process shown in FIG. 13 is the same as the process shown in FIG. 7 except that S20 and S24A are adopted in place of S23 and S24 (FIG. 7). Hereinafter, S20 and S24A will mainly be described.

Referring to FIG. 13 together with FIGS. 1 to 3, the process is executed in the order of S21, S22, S25, S26, and S27. When the product (trading target) for the bid in S26 is not won (contracted) (NO in S27), the process proceeds to S20. In S20, the server 600 determines whether to stop the bidding. Specifically, when three hours have elapsed since the process in S21 was executed, determination is made to stop the bidding (YES in S20). When three hours have not elapsed since the process in S21 was executed, determination is made not to stop the bidding (NO in S20). When the determination is NO in S20, the process returns to S22, and a bid is made in S26. The trading unit 614 may select and make a bid for the product under a preset condition. The trading unit 614 may select and make a bid for the product using a trained model obtained by machine learning using artificial intelligence (AI).

When the product (trading target) for the bid in S26 is won (contracted) (YES in S27), the process is executed in the order of S28, S29, and S24A, and then the series of processes shown in FIG. 13 is terminated. When the determination is YES in S20, the series of processes shown in FIG. 13 is terminated after the process in S24A is executed. In S24A, the server 600 reduces the frequency of communication between the server 300 and the target vehicle, for example, as in S24 of FIG. 7.

The Server 600 may determine whether the period T10A shown in FIG. 12 has elapsed through the process shown in FIG. 13. In the process shown in FIG. 13, determination is made that the period T10A has elapsed also when three hours have elapsed since the start of the period T10A without contract (YES in S20), and the frequency of communication between the server 300 and the target vehicle is returned to the normal communication frequency in S24A.

In the above embodiment, each vehicle in the vehicle group VG is the target vehicle. However, the vehicle group VG managed by the vehicle management device 1000 is not limited to this, and may include both the target vehicles that operate as the balancing power for the power grid PG and non-target vehicles that do not operate as the balancing power for the power grid PG. In the vehicle group VG, the target vehicles may be vehicles belonging to users who have concluded power balancing contracts (e.g., VPP contracts) with the aggregator, and the non-target vehicles may be vehicles belonging to users who have not concluded power balancing contracts. Alternatively, in the vehicle group VG, the target vehicles may be vehicles included in a consumer list pattern preregistered in the TSO server as resources to be used for the power balancing, and the non-target vehicles may be vehicles not included in the consumer list pattern. The vehicle management device 1000 may communicate with the target vehicles at a frequency higher than the frequency of communication with the non-target vehicles in at least one of the first to third periods. The server 300 may execute a process shown in FIG. 14 in place of the process shown in FIG. 4.

Figure 14:
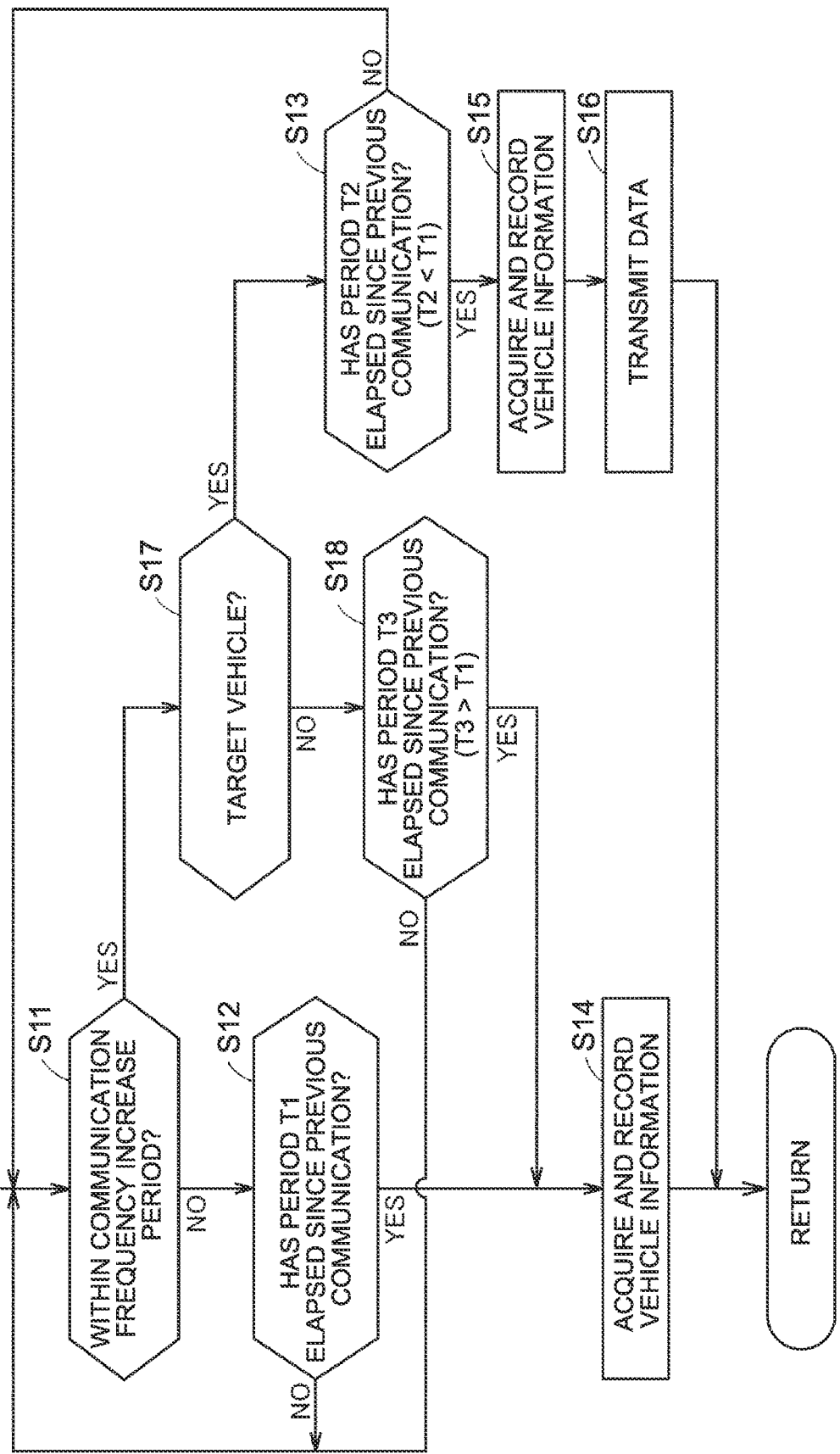
FIG. 14 is a flowchart showing a modification of the process shown in FIG. 4.

FIG. 14 is a flowchart showing a modification of the process shown in FIG. 4. The process shown in the flowchart is executed for each vehicle in the vehicle group VG. Hereinafter, the vehicle for which the process is executed is referred to as "managed vehicle". The server 300 repeatedly executes the process shown in FIG. 14 for the managed vehicle. The process shown in FIG. 14 is the same as the process shown in FIG. 4 except that S17 and S18 are added. Hereinafter, S17 and S18 will mainly be described.

Referring to FIG. 14 together with FIGS. 1 to 3, the process proceeds to S17 when the communication frequency increase period is currently applied (YES in S11). In S17, determination is made as to whether the managed vehicle is the target vehicle. When the managed vehicle is the target vehicle (YES in S17), the process proceeds to S13. The process in S13 and subsequent steps is the same as the process shown in FIG. 4.

When the managed vehicle is the non-target vehicle (NO in S17), the process proceeds to S18. In S18, the server 300 determines whether a predetermined period T3 has elapsed since the previous communication. The period T3 is a communication cycle (communication interval) of the non-target vehicle within the communication frequency increase period. The period T3 is set to a period longer than the period T1. The period T3 may be two hours. As a result, communication between the server 300 and the non-target vehicle is performed at a frequency of about 0.5 times per hour within the communication frequency increase period.

When the managed vehicle is the non-target vehicle, the determination is NO in S18 and the process returns to S11 until the period T3 elapses since the previous communication within the communication frequency increase period. When the period T3 has elapsed since the previous communication (YES in S18), the process proceeds to S14.

In the process shown in FIG. 14, the frequency of communication between the server 300 and the target vehicle is increased (S13), and the frequency of communication between the server 300 and the non-target vehicle is reduced (S18) within the communication frequency increase period. By reducing the frequency of communication between the server 300 and the non-target vehicle, troubles (increase in communication cost, etc.) along with an increase in communication frequency are suppressed. The communication between the server 300 and the non-target vehicle may be stopped within the communication frequency increase period.

In the above embodiment, the periods T10, T20, and T30 are used as the communication frequency increase periods for the provision of the balancing power for the products contracted in the market. However, the communication frequency increase period is not limited to this, and may be any one or any two of the periods T10, T20, and T30. The periods T20 and T30 are used as the communication frequency increase periods for the provision of the balancing power for the power balancing. However, the communication frequency increase period is not limited to this, and may be either one of the periods T20 and T30.

In the above embodiment and modifications, it is not essential that the power balancing by the resources is performed by the remote control. The selected resources may perform the power balancing by local control based on commands received in advance from the server.

The configuration of the power management system is not limited to the configuration shown in FIG. 1. Another server (e.g., a server of a higher-level aggregator) may be provided between the server 700 and the server 600. The server 600 may communicate with the server 700 via the other server. The functions of the server 300 may be implemented in the server 600 and the server 300 may be omitted. The server 600 may directly communicate with the vehicle group VG wirelessly. In the above embodiment, the on-premise servers (servers 300 and 600 shown in FIG. 1) function as management computers. However, the present disclosure is not limited to this, and the functions of the servers 300 and 600 (particularly, the functions related to vehicle management) may be implemented in a cloud by cloud computing.

The power grid PG is not limited to a large-scale AC grid provided by the electric power company, and may be a microgrid or a direct current (DC) grid. The configuration of the target vehicle is not limited to the configuration described above (see FIG. 2). The target vehicle may include a charger in place of the charger-discharger. The target vehicle may include a discharger in place of the charger-discharger to output electric power discharged from the on-board battery to the external power supply (e.g., the power grid PG) via a discharge connector instead of the EVSE. The on-board battery may be replaceable. The target vehicle may be an xEV other than the BEV (PHEV, FCEV, range extender EV, etc.).

The target vehicle may include a solar panel. The target vehicle may be rechargeable wirelessly. The target vehicle may be capable of autonomous driving or may have a flying function. The target vehicle is not limited to a passenger car, and may be a bus or a truck. The target vehicle may be an unmanned vehicle (e.g., a robotaxi, an automated guided vehicle (AGV), or an agricultural machine). The target vehicle may be an unmanned or single-seater small-sized BEV (e.g., a micropallet). The target vehicle may be a personally owned vehicle (POV), or a mobility as a service (MaaS) vehicle. The MaaS vehicle is a vehicle managed by a MaaS service provider.

The various modifications described above may be implemented in any combinations.

The embodiment disclosed herein should be considered to be illustrative and not restrictive in all respects. The scope of the present disclosure is shown by the claims rather than by the above description of the embodiment and is intended to include all modifications within the meaning and scope equivalent to those of the claims.

What is claimed is:

1. A vehicle management device comprising one or more computers configured to:
   periodically communicate with one or more target vehicles operable as a balancing power for an external power supply; and
   communicate with the target vehicles in at least one of a first period, a second period, and a third period at a frequency higher than an average communication frequency in periods excluding the first period, the second period, and the third period, the first period being a period immediately before a bid and a contract are made for the balancing power for the external power supply in an electricity market, the second period being a period immediately before a deadline for submission of a supply and demand planned value, the third period being a period in which provision of the balancing power for the external power supply is requested.

2. The vehicle management device according to claim 1, wherein the one or more computers are configured to:
make a bid for the balancing power in the electricity market; and
send a notification for causing one or more vehicles selected from among the target vehicles to operate as the balancing power contracted in the electricity market, and
wherein the first period is at least a part of a period from a timing that is three hours before the contract to a contract timing.

3. The vehicle management device according to claim 1, wherein the one or more computers are configured to:
determine the supply and demand planned value using information acquired from the target vehicles through communication; and
transmit the determined supply and demand planned value by the deadline for submission of the supply and demand planned value, and
wherein the second period is at least a part of a period from a timing that is three hours before the deadline for submission of the supply and demand planned value to the deadline for submission of the supply and demand planned value.

4. The vehicle management device according to claim 1, wherein the one or more computers are configured to:
determine whether all of one or more vehicles selected from among the target vehicles operate as the balancing power for the external power supply in the third period that is the period in which the provision of the balancing power for the external power supply is requested or a period obtained by adding a margin period of 30 minutes or less to at least one of parts before and after the period in which the provision of the balancing power for the external power supply is requested; and
when determination is made that any of the one or more vehicles selected from among the target vehicles does not operate as the balancing power for the external power supply in the third period, select a substitute vehicle from among the target vehicles using information acquired from the target vehicles through communication.

5. The vehicle management device according to claim 1, wherein the one or more computers are configured to:
communicate with the target vehicles in each of the first period, the second period, and the third period at the frequency higher than the average communication frequency in the periods excluding the first period, the second period, and the third period; and
perform behavior prediction for the target vehicles using information acquired from the target vehicles through communication in each of the first period, the second period, and the third period.

6. The vehicle management device according to claim 1, wherein:
the one or more computers are configured to periodically acquire vehicle information about the target vehicles by communicating with the target vehicles, and
the vehicle information includes at least one of positions of the target vehicles and states of charge of power storage devices provided in the target vehicles.

7. The vehicle management device according to claim 1, wherein the one or more computers are configured to communicate with the target vehicles in at least one of the first period, the second period, and the third period at a frequency higher than a frequency of communication with a non-target vehicle that does not operate as the balancing power for the external power supply.

8. The vehicle management device according to claim 1, wherein:
a frequency of communication with the target vehicles in the second period is higher than a frequency of communication with the target vehicles in the first period; and
a frequency of communication with the target vehicles in the third period is higher than the frequency of communication with the target vehicles in the second period.

9. The vehicle management device according to claim 1, wherein the supply and demand planned value is a planned value of at least one of demand and supply.

10. A vehicle management method comprising:
periodically communicating, by a vehicle management device, with one or more target vehicles operable as a balancing power for an external power supply in a communication period including a first period set as a period immediately before a bid and a contract are made for the balancing power for the external power supply in an electricity market, a second period set as a period immediately before a deadline for submission of a supply and demand planned value, and a third period set as a period in which provision of the balancing power for the external power supply is requested;
determining, by the vehicle management device, whether at least one of the first period, the second period, and the third period is within a communication frequency increase period; and
communicating, by the vehicle management device, with the target vehicles in the communication frequency increase period at a frequency higher than an average communication frequency in the communication period excluding the first period, the second period, and the third period.

11. The vehicle management method according to claim 10, further comprising:
making a bid for the balancing power in the electricity market; and
sending a notification for causing one or more vehicles selected from among the target vehicles to operate as the balancing power contracted in the electricity market, and
wherein the first period is at least a part of a period from a timing that is three hours before the contract to a contract timing.

12. The vehicle management method according to claim 10, further comprising:
determining the supply and demand planned value using information acquired from the target vehicles through communication; and
transmitting the determined supply and demand planned value by the deadline for submission of the supply and demand planned value, and
wherein the second period is at least a part of a period from a timing that is three hours before the deadline for submission of the supply and demand planned value to the deadline for submission of the supply and demand planned value.

13. The vehicle management method according to claim 10, further comprising:
determining whether all of one or more vehicles selected from among the target vehicles operate as the balancing power for the external power supply in the third period that is the period in which the provision of the balancing power for the external power supply is requested or a period obtained by adding a margin period of 30 minutes or less to at least one of parts before and after the period in which the provision of the balancing power for the external power supply is requested; and when determination is made that any of the one or more vehicles selected from among the target vehicles does not operate as the balancing power for the external power supply in the third period, selecting a substitute vehicle from among the target vehicles using information acquired from the target vehicles through communication.

14. The vehicle management method according to claim 10, further comprising:

communicating with the target vehicles in each of the first period, the second period, and the third period at the frequency higher than the average communication frequency in periods excluding the first period, the second period, and the third period; and performing behavior prediction for the target vehicles using information acquired from the target vehicles through communication in each of the first period, the second period, and the third period.

15. The vehicle management method according to claim 14, further comprising:

predicting, in the first period, the balancing power providable by the target vehicles using vehicle information about the target vehicles that is acquired from the target vehicles through communication;

determining, in the second period, the supply and demand planned value using the vehicle information about the target vehicles that is acquired from the target vehicles through the communication;

causing, in the third period, one or more vehicles selected from among the target vehicles to operate as the balancing power for the external power supply; and when any of the one or more vehicles selected from among the target vehicles is not operating as the balancing power for the external power supply in the third period, selecting a substitute vehicle from among the target vehicles using information acquired from the target vehicles through communication.

16. The vehicle management method according to claim 10, further comprising periodically acquiring vehicle information about the target vehicles by communicating with the target vehicles, and wherein the vehicle information includes at least one of positions of the target vehicles and states of charge of power storage devices provided in the target vehicles.

17. The vehicle management method according to claim 10, further comprising communicating with the target vehicles in at least one of the first period, the second period, and the third period at a frequency higher than a frequency of communication with a non-target vehicle that does not operate as the balancing power for the external power supply.

18. The vehicle management method according to claim 10, wherein the supply and demand planned value is a planned value of at least one of demand and supply.

19. The vehicle management method according to claim 10, wherein:

a frequency of communication with the target vehicles in the second period is higher than a frequency of communication with the target vehicles in the first period; and a frequency of communication with the target vehicles in the third period is higher than the frequency of communication with the target vehicles in the second period.

* * * * *